US008758197B2

(12) United States Patent
Kamada et al.

(10) Patent No.: US 8,758,197 B2
(45) Date of Patent: Jun. 24, 2014

(54) IDLE STOP CONTROL DEVICE FOR VEHICLE

(75) Inventors: Shinya Kamada, Kure (JP); Motomi Kobayashi, Hiroshima (JP); Koshiro Saji, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 308 days.

(21) Appl. No.: 13/167,561

(22) Filed: Jun. 23, 2011

(65) Prior Publication Data

US 2011/0319227 A1 Dec. 29, 2011

(30) Foreign Application Priority Data

Jun. 28, 2010 (JP) ................................. 2010-146568
Apr. 18, 2011 (JP) ................................. 2011-092016

(51) Int. Cl.
*B60W 10/00* (2006.01)
*B60W 10/04* (2006.01)
*B60W 10/10* (2012.01)

(52) U.S. Cl.
USPC ................. 477/77; 477/79; 477/83; 477/112; 477/115

(58) Field of Classification Search
USPC ........... 477/77, 79–81, 83, 84, 107, 110, 112, 477/115–117
See application file for complete search history.

(56) References Cited

U.S. PATENT DOCUMENTS

| 6,881,170 B2 * | 4/2005 | Onoyama et al. ................ 477/39 |
| 7,828,692 B2 * | 11/2010 | Hayashi et al. ................... 477/3 |
| 2008/0242464 A1 * | 10/2008 | Kumazaki et al. ............ 475/136 |

FOREIGN PATENT DOCUMENTS

| EP | 1260739 A2 | 11/2002 |
| JP | 2000356148 A | * 12/2000 |
| JP | 2003-039988 A | 2/2003 |
| JP | 2004003425 A | * 1/2004 |

* cited by examiner

*Primary Examiner* — Tisha Lewis
(74) *Attorney, Agent, or Firm* — Alleman Hall McCoy Russell & Tuttle LLP

(57) ABSTRACT

A vehicle idle stop system is disclosed. The idle stop system comprises an engine, an automatic transmission, a first oil pump driven by said engine and generating hydraulic pressure which is supplied to a friction element of said automatic transmission, a second oil pump capable of operating and generating hydraulic pressure which is supplied to a friction element of said automatic transmission during an engine stop, and a controller. The controller is configured to control the engine to stop when a predetermined engine stop condition is satisfied, and to control the second oil pump to supply hydraulic pressure to a predetermined friction element coupled to a forward starting gear of the automatic transmission, the hydraulic pressure supplied to couple the predetermined friction element when the engine is automatically stopped and when a gear range of the automatic transmission is in a neutral range.

22 Claims, 26 Drawing Sheets

|  | FIRST CLUTCH (10) | SECOND CLUTCH (20) | FIRST BRAKE (70) | SECOND BRAKE (80) | THIRD BRAKE (90) |
|---|---|---|---|---|---|
| FIRST GEAR | COUPLED |  | (COUPLED) |  |  |
| SECOND GEAR | COUPLED |  |  | COUPLED |  |
| THIRD GEAR | COUPLED | COUPLED |  |  | COUPLED |
| FOURTH GEAR | COUPLED | COUPLED |  |  |  |
| FIFTH GEAR |  | COUPLED |  |  | COUPLED |
| SIXTH GEAR |  | COUPLED |  | COUPLED |  |
| REVERSE GEAR |  |  | COUPLED |  | COUPLED |

FIG. 2

IDLE STOP CONTROL DEVICE FOR VEHICLE

BACKGROUND

The present invention relates to an idle stop control device for a vehicle, such as an automobile, especially for the vehicle provided with an automatic transmission, and belongs to a field of traveling control technique of the vehicle.

In recent years, vehicles which perform what is called "idle stop control", where an engine is automatically stopped when a predetermined stop condition is satisfied and the engine is automatically restarted when a predetermined restart condition is satisfied upon the vehicle stopping at an intersection or the like, are put in practical use.

When carrying out the idle stop control in a vehicle equipped with an automatic transmission, an oil pump which is driven by the engine to supply an operating pressure to each friction element of the automatic transmission is also stopped at the time of the engine stop. Therefore, a friction element which is coupled just before the vehicle stop (in other words, a friction element which transmits a motive force at the time of a vehicle start) is once released and, then, it will be again coupled at the time of an engine restart. However, in such a case, problems such as degradation of a vehicle starting performance due to a response delay of the coupling and a shock associated with the coupling occur.

JP2003-39988A discloses an engine automatic stop/start device which is provided with an electric oil pump driven by an electric motor, in addition to the oil pump driven by the engine. An operating pressure is applied from the electric oil pump to the friction element to maintain the friction element in a state where it is coupled also during the engine stop. Accordingly, the degradation of the vehicle starting performance due to the response delay of coupling of the friction element at the time of engine restarting and the generation of the shock when coupling the friction element are avoided.

Meanwhile, a vehicle's operator may switch a gear range of the automatic transmission from a traveling range such as D-range to a neutral range such as N-range during or before the automatic stop of the engine when the vehicle is stopped. In this case, since the automatic transmission is controlled so as to evacuate an operating pressure from each friction element, even if the electric oil pump is operated during the engine automatic stop, a friction element which transmits a motive force when the vehicle starts is released. Therefore, when a switching operation is carried out again to the traveling range upon starting of the vehicle, the friction element is again coupled and, due to the coupling delay, the start response after the engine restart is degraded and the shock occurs at the time of coupling the friction element.

SUMMARY

Therefore, the present invention addresses the above problems when performing an idle stop control in a vehicle equipped with an automatic transmission and, thus, provides an idle stop control device for a vehicle, which can obtain a good start response when switching to a traveling range upon a subsequent start of the vehicle without causing any shocks, also when a switching operation from a traveling range to a neutral range is performed at the time of an engine automatic stop.

According to one aspect of the present invention, an idle stop system for a vehicle is provided. The vehicle is equipped with an engine, an automatic transmission, and controller for automatically stopping the engine when a predetermined engine stop condition is satisfied while the vehicle is not traveling and for automatically restarting the engine when a predetermined engine restart condition is satisfied during the automatically-stopping state. The idle stop system includes a first oil pump that is provided to the automatic transmission and driven by the engine to generate hydraulic pressure to be supplied to each friction element, a second oil pump for operating during the automatic stop of the engine by the controller, provided independently from the first oil pump, and a hydraulic control circuit for supplying the hydraulic pressure to a predetermined friction element coupled by the second oil pump to a forward starting gear of the automatic transmission to couple the friction element when the engine is automatically stopped by the controller and when a gear range of the automatic transmission is in a neutral range.

According to the above configuration, during the automatic stop of the engine by the controller, the second oil pump, such as an electric oil pump, is operated to supply the hydraulic pressure to the predetermined friction element that is coupled at the forward starting gear. Therefore, even if the first oil pump which is driven by the engine stops due to the engine automatic stop, the predetermined friction element is maintained in the coupling state.

In this case, since the predetermined friction element is maintained in the coupling state even if it is in the engine automatic stopping state in the neutral range, it is not necessary to again couple the predetermined friction element when the range is switched to the forward traveling range upon a subsequent start of the vehicle. Therefore, generation of a response delay and a shock due to the re-coupling is avoided, and a vehicle starting performance with a smooth and good response can be obtained.

Meanwhile, in the state where the gear range of the automatic transmission is in the neutral range when the engine is automatically stopped, if the predetermined friction element is maintained in the coupling state by the hydraulic pressure generated by the second oil pump, the automatic restart condition of the engine is satisfied such as that a brake is released, or an automatic stop inhibiting condition of the engine is satisfied, such as that a battery charge level falls, before the range is switched to a traveling range. Then, when the engine is automatically restarted, it may cause a problem that the vehicle starts in a state where the gear range of the automatic transmission is in the neutral range.

On the other hand, in one embodiment, the idle stop system may further include a first linear solenoid valve for controlling the hydraulic pressure supplied to the predetermined friction element. The first linear solenoid valve may evacuate the hydraulic pressure supplied to the predetermined friction element when the engine is automatically stopped and the engine is then automatically restarted in a state where the hydraulic pressure generated by the second oil pump is supplied to the predetermined friction element while the gear range of the automatic transmission is in the neutral range.

According to the above configuration, when the engine is automatically restarted in a state where the gear range of the automatic transmission is in the neutral range and the predetermined friction element is coupled by the hydraulic pressure generated by the second oil pump, the first linear solenoid valve evacuates the hydraulic pressure supplied to the predetermined friction element. Therefore, the friction element can be released. Thereby, the problem that the vehicle starts when the engine is restarted in the neutral range can be avoided.

In one embodiment, the idle stop system may further include a first linear solenoid valve for controlling the hydraulic pressure supplied to the predetermined friction element.

When the gear range of the automatic transmission is switched to a reverse range from the neutral range during the engine automatic stop, the hydraulic control circuit may couple the friction element that is coupled at a reverse gear, and the first linear solenoid valve may evacuate the hydraulic pressure supplied to the predetermined friction element.

According to the above configuration, the gear range of the automatic transmission is switched to the neutral range during that engine automatic stop and, when the range is switched to the reverse range in order to start the vehicle at the reverse gear, the friction element that is coupled at the reverse gear is coupled. In addition, the hydraulic pressure supplied to the predetermined friction element that is coupled at the forward starting gear is evacuated by the first linear solenoid valve to release the friction element. Therefore, the interlock due to the friction element that is coupled at the reverse gear being coupled while the predetermined friction element being coupled can be avoided; thereby a smooth start at the reverse gear can be achieved.

In this case, in one embodiment, the hydraulic control circuit may couple the friction element that is coupled at a reverse gear after a coupling force of the predetermined friction element decreases below a predetermined value by the evacuation of the hydraulic pressure.

According to the above configuration, since the friction element that is coupled at the reverse gear is coupled after a coupling force of the predetermined friction element that is coupled at the forward starting gear decreases below the predetermined value, the shift to the reverse gear will be performed more smoothly, without producing an interlocking state.

Meanwhile, when the engine is automatically stopped after the gear range of the automatic transmission is switched to the neutral range from the forward traveling range, the hydraulic pressure is once evacuated from the predetermined friction element and, then, the hydraulic pressure will be again supplied to the predetermined friction element by the second oil pump that starts operating from the engine automatic stop state. After that, when the range is switched to the forward traveling range and the engine is automatically restarted, the first oil pump that is driven by the engine will supply the operating pressure to the predetermined friction element instead of the second oil pump.

In this case, since the second oil pump only generates the operating pressure supplied to the predetermined friction element, it normally has a smaller capacity, compared with the engine-driven oil pump for generating the operating pressure supplied to all the friction elements. In such a case, when a state where the second oil pump supplies the operating pressure to the predetermined friction element is switched to the state where the first oil pump supplies the hydraulic pressure, the hydraulic pressure by the second oil pump may not fully be raised. Therefore, when the first oil pump starts supplying the hydraulic pressure, the hydraulic pressure supplied to the predetermined friction element may rise suddenly, and a shock by rapid coupling of the friction element may occur.

On the other hand, in one embodiment, the idle stop system may further include a first linear solenoid valve for controlling the operating pressure supplied to the predetermined friction element. When the engine is automatically stopped after the gear range of the automatic transmission is switched to the neutral range from a forward traveling range and, after that, when the engine is automatically restarted and the hydraulic pressure generated by the first oil pump instead of the second oil pump is supplied to the predetermined friction element, the first linear solenoid valve may suppress an increase of the hydraulic pressure supplied to the predetermined friction element from the first oil pump when the hydraulic pressure supplied to the predetermined friction element by the second oil pump is lower than a predetermined value.

According to the above configuration, the engine is automatically stopped after the gear range of the automatic transmission is switched to the neutral range from the forward traveling range, and the second oil pump again supplies the hydraulic pressure to the predetermined friction element. After that, the range is switched to the forward traveling range and the supply of the hydraulic pressure to the predetermined friction element is switched to the first oil pump. Then, when the hydraulic pressure supplied to the predetermined friction element is lower than the predetermined value, since the first linear solenoid valve controls so that the hydraulic pressure supplied to the predetermined friction element does not rise suddenly, the shock due to the predetermined friction element being coupled rapidly can be suppressed.

In one embodiment, the hydraulic control circuit may be provided with a manual valve arranged between the first oil pump and the predetermined friction element and for interlocking with a switching operation of a range to communicate the first oil pump with the predetermined friction element in a forward traveling range. The second oil pump may be connected with an oil passage communicating with the predetermined friction element from the manual valve, via a shift valve for selectively communicating one of an oil passage portion from a second oil pump side and an oil passage portion from a manual valve side with a predetermined friction element side.

According to the above configuration, since the second oil pump is connected with the oil passage between the manual valve and the predetermined friction element via the shift valve, the hydraulic pressure can be supplied to the predetermined friction element, without supplying the hydraulic pressure via the manual valve. Thereby, the configuration of the oil passage can be simplified.

On the other hand, in one embodiment, the second oil pump may be an electric oil pump and include a pump motor for controlling a rotation speed of the electric oil pump, and the controller may be configured to receive input from a range sensor for detecting a coupling state of the predetermined friction element. The pump motor may control the rotation speed of the electric oil pump to a first predetermined rotation speed when the engine is automatically stopped in a state where the automatic transmission is in the neutral range and, after that, the pump motor may control the rotation speed to a second rotation speed that is lower than the first rotation speed when the controller detects that the predetermined friction element is coupled.

Alternatively, in one embodiment, the second oil pump may be an electric oil pump and include a pump motor for controlling a rotation speed of the electric oil pump. The pump motor may control the rotation speed of the electric oil pump to a first predetermined rotation speed for a predetermined time period when the engine is automatically stopped in a state where the automatic transmission is in the neutral range and, after that, the pump control module may control the rotation speed to a second rotation speed that is lower than the first rotation speed.

According to the above configurations, in a condition where the second oil pump is the electric oil pump, when the engine is automatically stopped in the state where the automatic transmission is in the neutral range, the rotation speed of the electric oil pump is controlled to the first rotation speed that is a relatively high rotational speed. Thereby, the hydraulic pressure for coupling of the predetermined friction element from which the hydraulic pressure is once evacuated when switched from the forward traveling range to the neutral range will be promptly raised immediately after the engine automatic stop.

Therefore, also when the vehicle restarts after a comparatively short period of time after the engine automatic stop, the predetermined friction element is securely coupled. Thereby, the event where the friction element slips at the time of restart due to the delay of the rising edge of the hydraulic pressure and the delay of coupling of the predetermined friction element associated with this can be avoided. Thus, a necessary start response can be obtained.

Particularly, as described above, the electric oil pump normally has a smaller capacity than that of the engine-driven oil pump and, therefore, a good start response may not be able to be obtained by a normal control because the rising edge of the hydraulic pressure for coupling is delayed. This problem can be solved by the above configurations of the invention.

In addition, as described above, after setting the rotation speed of the electric oil pump to the relatively-high first rotation speed immediately after the engine automatic stop, according to the former configuration when the controller detects that the predetermined friction element is coupled, and according to the latter configuration when, for example, a predetermined time period, which is set to a time period required for coupling of the predetermined friction element after the engine automatic stop, is lapsed, the rotation speed of the electric oil pump is controlled to the second rotation speed that is a lower rotation speed than the first rotation speed. Therefore, unnecessary energy consumption by maintaining the high first rotation speed even after the predetermined friction element is coupled can be suppressed for both the configurations.

In such a case, in one embodiment, the first rotation speed may be a maximum rotation speed that is set to the electric oil pump in advance.

According to the above configuration, since the first rotation speed of the electric oil pump is controlled to the maximum rotation speed which is set to the pump in advance, a fall of durability or the like due to an over-speed rotation of the pump can be prevented, and the delay of coupling of the predetermined friction element after the engine automatic stop can be effectively prevented while protecting the pump.

In one embodiment, the controller may further be configured to receive input from a brake sensor for detecting an operating state of a brake. In a state where the gear range of the automatic transmission is in the neutral range and the controller detects coupling of the brake, when the engine is automatically stopped by the controller, the controller may restart the engine when the controller detects that the brake is shifted from the coupling state to a re-coupling state via a released state.

According to the above configuration, when the gear range of the automatic transmission is in the neutral range and when the engine is automatically stopped in the state where the brake is coupled, even if there is no switching operation by a vehicle's operator of the vehicle from the neutral range to the forward traveling range, when the brake is shifted from the coupling state to the re-coupling state via the released state or, in other words, it can be guessed that the gear range will soon switched to the forward traveling range to start the vehicle, the engine is automatically restarted at this time. Therefore, the engine can be started without any delay corresponding to a start request of the vehicle's operator.

BRIEF DESCRIPTION OF THE DRAWINGS

FIG. 2 is a connection table of friction elements of the automatic transmission.

DESCRIPTION OF EMBODIMENTS

Hereinafter, embodiments of the present invention are described.

Figure 1A:
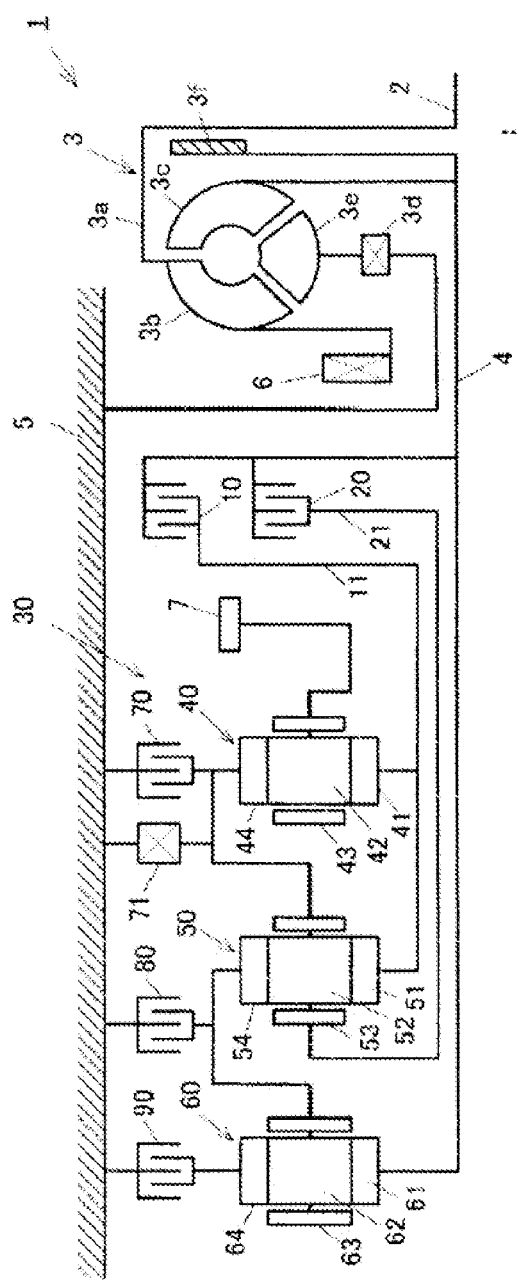
FIGS. 1A and 1B are schematic diagrams of an automatic transmission according to a first embodiment of the present invention.
Figure 1B:
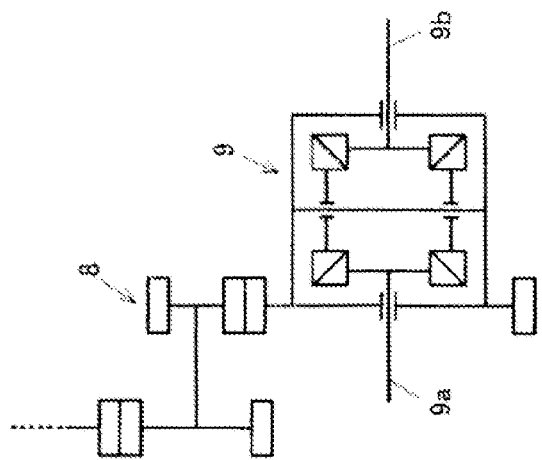

An automatic transmission to which an idling stop control device according to the first embodiment of the present invention is implemented is described first. As essential parts are schematically illustrated in FIGS. 1A and 1B, the automatic transmission 1 is implemented on a vehicle with a transversely-mounted engine such as a front-engine front-drive vehicle, and includes main configuration elements such as a torque converter 3 attached to an engine output shaft 2, a first clutch 10 and a second clutch 20 to which a power from the torque converter 3 is inputted via an input shaft 4, and a transmission mechanism 30 to which the power is inputted from the first clutch 10, the second clutch 20 and the input shaft 4. These components are arranged along an axis of the input shaft 4 and are encased within a transmission case 5.

Further, between the torque converter 3 and the first and second clutches 10 and 20, a mechanical hydraulic pump 6 actuated by the engine through the torque converter 3 is arranged, and also between the first and second clutches 10 and 20 and the transmission mechanism 30, an output gear 7 for outputting the power from the transmission mechanism 30 is arranged. Further, the power outputted by the output gear 7 is transferred through a counter drive mechanism 8 to a differential system 9, and, further, front wheels are actuated through axle shafts 9a and 9b.

The torque converter 3 is configured by a case 3a coupled to the engine output shaft 2, a pump 3b fixedly mounted within the case 3a, a turbine 3c opposingly arranged against the pump 3b and actuated by the pump 3b through an operating hydraulic fluid, a stator 3e arranged between the pump 3b and the turbine 3c, supported by the transmission case 5 through a one-way clutch 3d, and for performing an amplification of a torque, and a lock-up clutch 3f interposing between the case 3a and the turbine 3c and for directly connecting the engine output shaft 2 and the turbine 3c through the case 3a. Thereby, a rotation of the turbine 3c is transferred through the input shaft 4 to the first and second clutches 10 and 20 and further to the transmission mechanism 30 side.

Further, the transmission mechanism 30 includes first, second and third planetary gear sets 40, 50 and 60 (hereinafter, they are referred to as "first, second and third gear sets" correspondingly), and they are arranged within the transmission case 5 in this order from the side of the torque converter 3.

As friction elements, the transmission mechanism 30 is equipped with, other than the first and second clutches 10 and 20, a first brake 70, a second brake 80, and a third brake 90, which are arranged in this order from the engine side. In parallel to the first brake 70, a one-way clutch 71 is also arranged.

The first, second and third gear sets 40, 50 and 60 are all single-pinion type planetary gear sets and are constituted with sun gears 41, 51 and 61, pinion gear subsets 42, 52 and 62 where a plurality of pinion gears are meshed together with the sun gears 41, 51 and 61, carrier gears 43, 53 and 63 for supporting the pinion gear subsets 42, 52 and 62, and ring gears 44, 54 and 64 meshed with the pinion gear subsets 42, 52 and 62, respectively.

Further, the input shaft 4 is coupled to the sun gear 61 of the third gear set 60, at the same time, the sun gear 41 of the first gear set 40 and the sun gear 51 of the second gear set 50, the ring gear 44 of the first gear set 40 and the carrier gear 53 of the second gear set 50, and the ring gear 54 of the second gear set 50 and the carrier gear 63 of the third gear set 60, are coupled to each other, respectively. Then, the carrier gear 43 of the first gear set 40 is coupled to the output gear 7.

In addition, the sun gear 41 of the first gear set 40 and the sun gear 51 of the second gear set 50 are coupled to an output component 11 of the first clutch 10 and further disconnectably coupled through the first clutch 10 to the input shaft 4. Also, the ring gear 44 of the first gear set 40 and the carrier gear 53 of the second gear set 50 are coupled to an output component 21 of the second clutch 20 and further disconnectably coupled through the clutch 20 to the input shaft 4.

Further, the ring gear 44 of the first gear set 40 and the carrier gear 53 of the second gear set 50 are disconnectably coupled, to the transmission case 5 through the first brake 70 and the one-way clutch 71 which are arranged in parallel to each other. The ring gear 54 of the second gear set 50 and the carrier gear 63 of the third gear set 60 are disconnectably coupled to the transmission case 5 through the second brake 80, and additionally the ring gear 64 of the third gear set 60 is disconnectably coupled to the transmission case 5 through the third brake 90.

According to the configurations described above, in the automatic transmission 1, six gears in forward and one gear in reverse can be obtained through combinations of coupling states of the first and second clutches 10 and 20, and the first, second and third brakes 70, 80 and 90, and relations of the combinations of the coupling states and shifting gear stages are indicated by a coupling table in FIG. 2.

Here, the first brake 70 is coupled within a range for an engine brake operation, and although, under, for example, a D-range, the one-way clutch 71 couples instead of the first brake 70 thus the first gear stage is achieved, there is a case where the first brake 70 is coupled under the first gear in, for example, the D-range.

Figure 3:
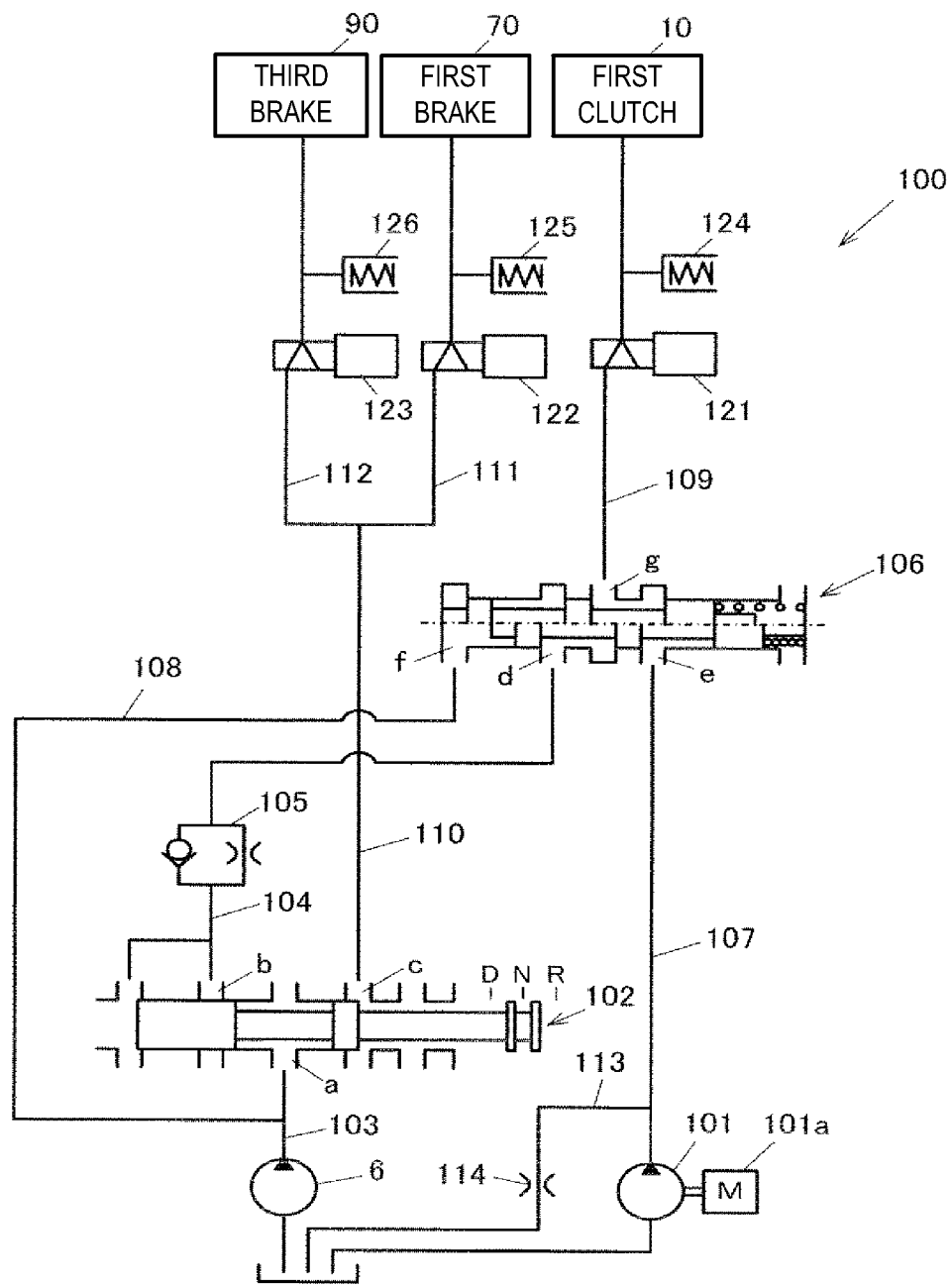
FIG. 3 is a circuit diagram of a substantial part of a hydraulic control circuit of the automatic transmission.

The coupling and releasing of each of the clutches 10 and 20 and the brakes 70, 80 and 90 as described above are controlled by a hydraulic control circuit 100; within the hydraulic control circuit 100, parts for achieving the first gear as the shifting gear stage for at a time of just before a vehicle stop and at a time of a vehicle start, and the reverse are configured as shown in FIG. 3.

That is, the hydraulic control circuit 100 includes, besides the above described mechanically actuated oil pump 6 (hereinafter, it is referred to as "mechanical pump"), an electrically actuated oil pump 101 (hereinafter, it is referred to as "electric pump") actuated by a motor 101a. Arranged on a discharge side of the mechanical pump 6 is a manual valve 102 for distributing and supplying hydraulic pressure from the mechanical pump 6 to each of the friction elements corresponding to a range position.

The manual valve 102 includes an input port "a" connected with the mechanical pump 6 through a line 103, a forward movement output port "b" communicated with the input port "a" under forward traveling ranges such as the D-range, and a reverse movement output port "c" communicated with the input port "a" under an R-range. Under an N-range, the input port "a" is not communicated with either one of the output ports "b" or "c" where the output ports "b" and "c" are drained.

A forward movement line 104 connected with the forward movement output port "b" is led, through an one-way throttling mechanism 105 configured with an orifice and a check valve and having a function to throttle the hydraulic fluid in an evacuation direction, to an oil pump shift valve 106 (hereinafter, it is referred to as a "shift valve") and is connected to a first input port "d" of the shift valve 106.

Further, a second input port "e" of the shift valve 106 is connected with a discharge side of the electric pump 101 through a line 107, and a line 108 which is branched from the line 103 on the discharge side of the mechanical pump 6 is connected with a control port "f" on one end of the shift valve 106.

Then, when the mechanical pump 6 is in operation, a discharged pressure therefrom is inputted to the control port "f" of the shift valve 106 through the line 108, and, thus, a spool moves against a spring force to a right side position (hereinafter, it is referred as a "first position") indicated in a lower half of FIG. 3, and, therefore, the first input port "d" is communicated with an output port "g" of the shift valve 106.

Further, when the mechanical pump 6 is not in operation, because no discharged pressure of the pump 6 is inputted to the control port "f", the spool moves to a left side position (hereinafter, it is referred to as a "second position") indicated in an upper half of FIG. 3 due to the spring force, and the second input port "e" is communicated with the output port "g" at this time.

Then, the output port "g" of the shift valve 106 is connected with the line 109, and the line 109 is led to the clutch 10 through a first linear solenoid valve 121 for hydraulic control.

On the other hand, a line 110 is connected with the second output port "c" of the manual valve 102. The line 110 is branched out to a line 111 and a line 112, and the lines 111 and 112 are led to the first brake 70 and the second brake 90 through a second linear solenoid valve 122 and a third linear solenoid valve 123 for hydraulic control, respectively.

Note that, the line 107 on the discharge side of the electric pump 101 has a pressure exhaust circuit 113 branched out therefrom, and an orifice 114 is arranged on the pressure exhaust circuit 113. Further, downstream of the linear solenoid valves 121, 122 and 123, accumulators 124, 125 and 126 for absorbing hydraulic vibrations which are caused by the solenoid valves 121, 122 and 123 are provided.

A control system for controlling the automatic transmission 1 and performing an idling stop control of the engine is described next.

Figure 4:
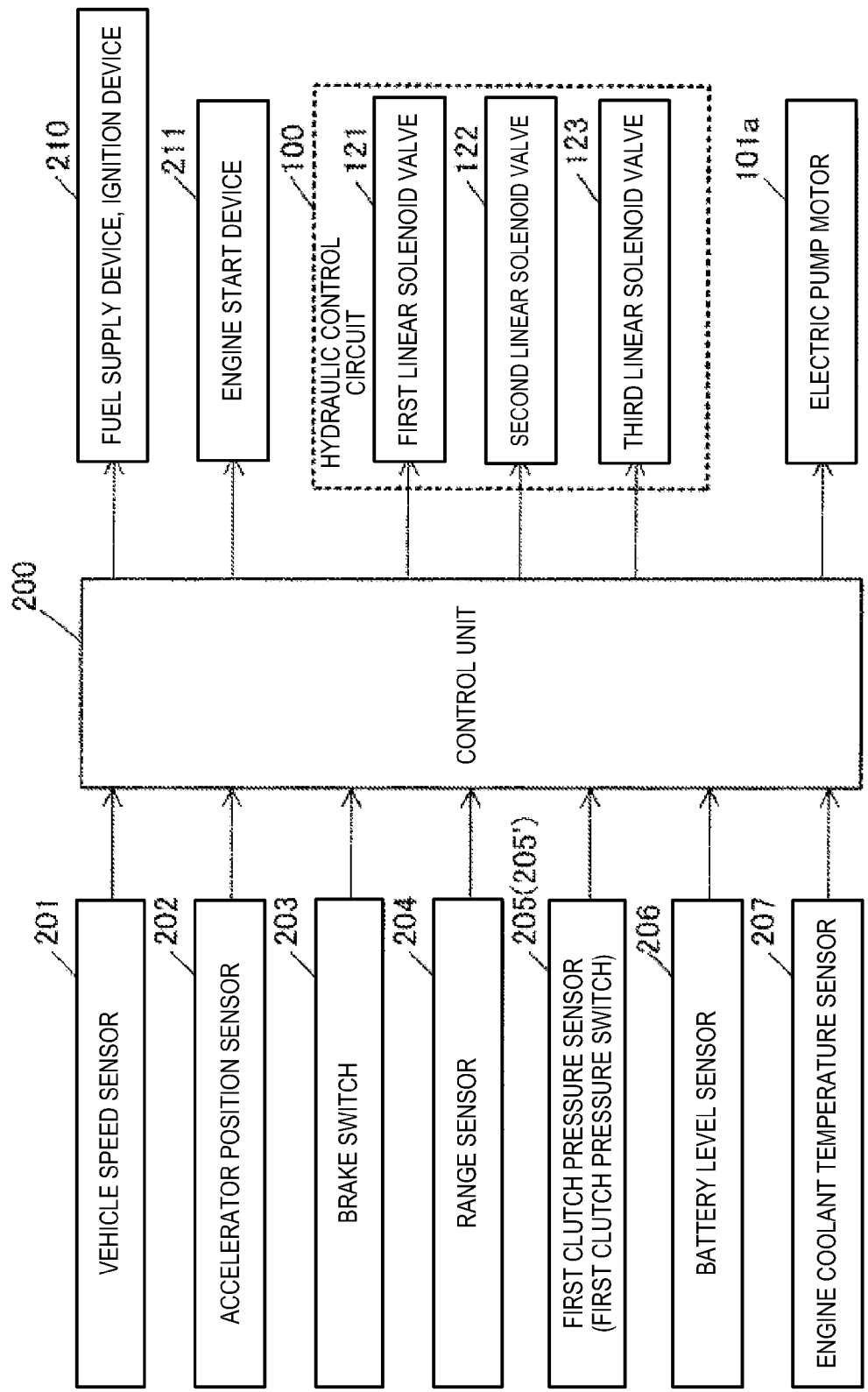
FIG. 4 is a block diagram showing a control system of an engine and an automatic transmission.

As indicated in FIG. 4, a controller, such as control unit 200, as the center of the control system is inputted with signals from a vehicle speed sensor 201 for detecting a vehicle speed, an accelerator position sensor 202 for detecting a depression amount of the accelerator, a brake switch 203 for detecting whether a brake is depressed, a range sensor 204 for detecting the range of the automatic transmission 1 which is selected by a vehicle's operator, a first clutch pressure sensor 205 for detecting an operating pressure (hereinafter, it is referred to as a "first clutch pressure") supplied to the first clutch 10, a battery level sensor 206 for detecting an amount of a charge level of a battery installed in the vehicle, and an engine coolant temperature sensor 207 for detecting the temperature of an engine coolant.

Then, based on these inputted signals, the control unit 200 performs the idling stop control as described as follows.

That is, when predetermined engine automatic stop conditions are satisfied, more specifically, under conditions where the battery charge level is a predetermined amount or above and the temperature of the engine coolant is a predetermined temperature or above, when the speed of the vehicle is a predetermined speed or lower, the opening amount of the accelerator is a predetermined amount or less, and the brake is depressed, an engine stop signal for stopping an operation of a device 210 for operating the engine, such as a fuel supply device and an ignition device, is outputted to the device 210 and thus stops the engine.

Further, when an automatic restart condition is satisfied, such as when the depression of the brake is released, or when the range of the automatic transmission 1 is switched from a neutral range to a traveling range, an engine start signal is outputted to the above described device 210 for operating the engine and an engine start device 211 in order to restart the engine.

Furthermore, based on the vehicle speed and the accelerator position, the control unit 200 performs a shifting control of the automatic transmission 1 according to the selected range. While controlling the above described idling stop, by outputting control signals to the first through third linear solenoid valves 121, 122 and 123 within the hydraulic control circuit 100 of the automatic transmission 1 and to the motor 101a for actuating the electric pump 101, the control unit 200 performs a coupling control of the friction elements of the automatic transmission 1 during idle stop according to, for example, the switching of the range and the first clutch pressure.

Next, the coupling operation of the friction elements of the automatic transmission 1 by the electric pump 101 during idle stop control is described in detail with reference to FIGS. 5 to 10.

Figure 5:
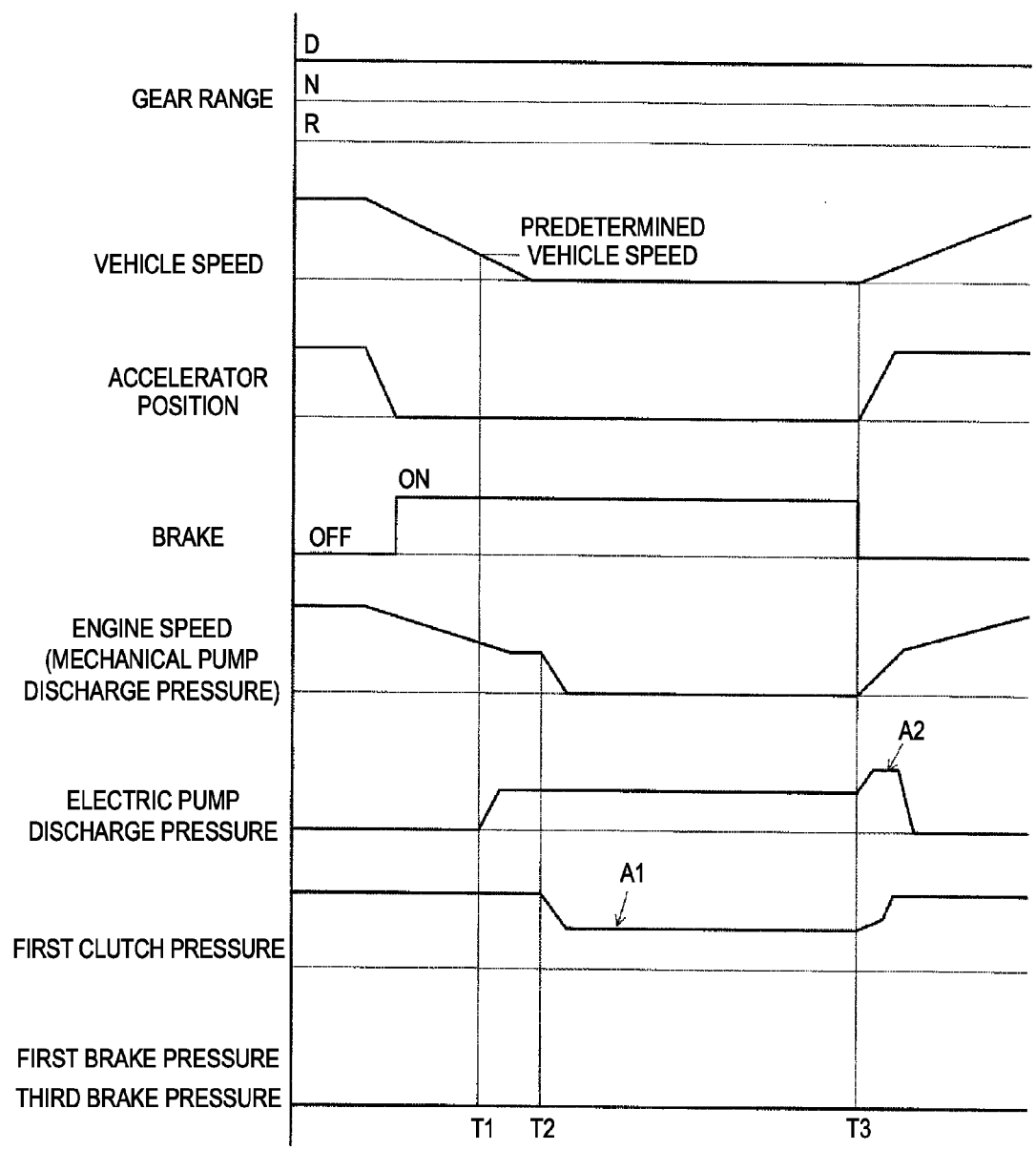
FIG. 5 is a timing chart showing a first operation in an idle-stop mode.

An operation shown in FIG. 5 is an operation case where the vehicle is stopped while the D-range is selected as a forward traveling range, and after the engine is automatically stopped, the engine is restarted without the switching operation to a different range is performed. Initially, in this operation, the electric pump 101 starts to operate at a timing T1 where the vehicle speed becomes the predetermined speed or lower (at the speed of the engine stop conditions or above) prior to the automatic stop of the engine, and subsequently at a timing T2 where the engine automatic stop conditions are satisfied, the engine automatically stops.

At this point, due to the mechanical pump 6 actuated by the engine being stopped, the operating pressure supply from the pump 6 to the first clutch 10 is stopped; however according to the hydraulic control circuit 100 as shown in FIG. 3, due to a reduced discharged pressure from the mechanical pump 6, the spool within the shift valve 106 moves to the second position and the line 107 led from the electric pump 101 communicates with the line 109 which is communicated with the first clutch 10.

Therefore, the operating pressure from the electric pump 101 which has already started operating at the timing T1, which is before the automatic engine stop, replaces the operating pressure from the mechanical pump 6 and is supplied to the first clutch 10 through the line 109, and thus a state is maintained where the first clutch pressure is supplied, that is, the first clutch 10 is coupled as indicated by the symbol A1 in FIG. 5. In such case, the first clutch pressure which is supplied from the electric pump 101 is controlled by a comparatively low hydraulic pressure just high enough to keep the coupling state.

Subsequently, at a timing T3, when the release of the depression of the brake, that is the condition for the engine restart, is detected, the engine is restarted, and because the first clutch 10 of the automatic transmission 1 is in the coupled state, that is, the state of the first gear is maintained, the vehicle immediately starts corresponding to the depression of the accelerator.

Then, due to the mechanical pump 6 starting to operate corresponding to the start of the engine, the discharged pressure from the mechanical pump 6 raises up, and the spool within the shift valve 106 moves to the first position, thus the operating pressure from the mechanical pump 6 is supplied to the first clutch 10 as the first clutch pressure. Thereby, the role of the electric pump 101 is finished and stops.

In such a case, during the automatic engine stop, because the first clutch pressure is controlled by the comparatively low hydraulic pressure, a rotation speed of the electric pump 101 is increased as indicated by the symbol A2, so as to momentarily increase the discharged pressure just before the vehicle stop in order for the first clutch pressure to swiftly raise to a necessary level at which point the vehicle can again start moving.

As described above, the first clutch 10 is maintained in the coupled state even during the automatic stop of the engine, thus the first clutch does not need to be re-coupled at the start of the movement of the vehicle; therefore, a response delay for coupling the first clutch 10 is prevented and resulting in a good vehicle response at the start of the movement, and a shock from the coupling of the first clutch 10 is avoided.

Figure 6:
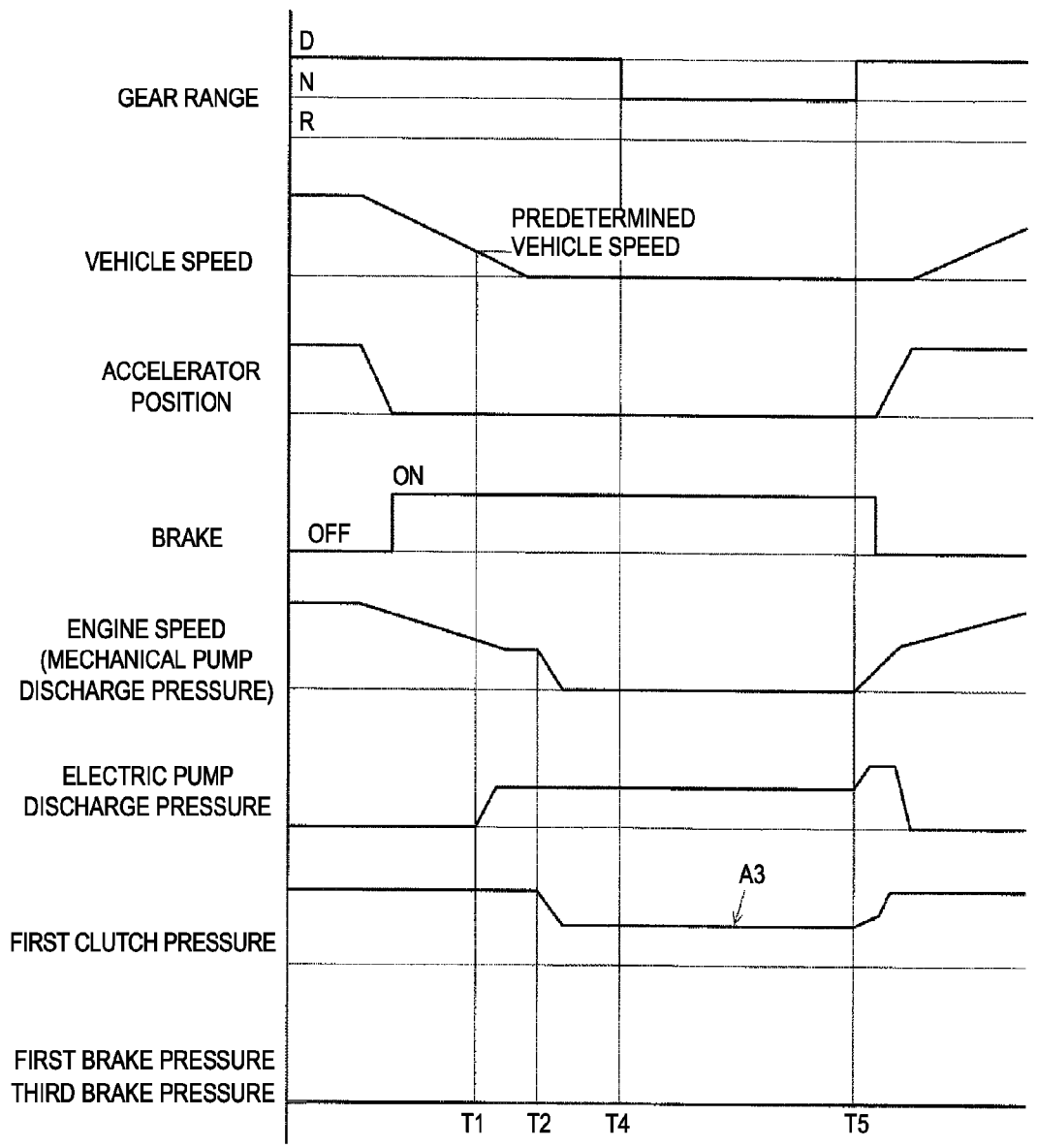
FIG. 6 is a timing chart showing a second operation in the idle-stop mode.

Next, an operation shown in FIG. 6 is a case where the vehicle is stopped while the D-range is selected, and after the engine stops automatically the vehicle's operator performs a switching operation from the D-range to the N-range and, then, performs a switching operation back to the D-range to start the vehicle. In this case also, the electric pump 101 starts to operate at the timing T1 and the engine stops at the timing T2. Thus, due to the mechanical pump 6 being stopped accompanying the automatic engine stop, the spool within the shift valve 106 moves to the second position, and, at this timing T2, the electric pump 101, alternative to the mechanical pump 6, starts the supply of the first clutch pressure.

Subsequently, at a timing T4, the switching operation from the D-range to the N-range is performed, and, as indicated by the symbol A3, the electric pump 101 continues to supply the first clutch pressure even after the range is switched to the N-range and, thus, the first clutch 10 is maintained in the coupled state.

As above, when the switching operation from the D-range to the N-range is performed while the engine is automatically stopped, the switching operation from the N-range to the D-range is recognized as the engine restart condition, and, thus, at a timing T5 where the switching operation from the N-range to the D-range is performed, the engine is restarted. Subsequently, by the release of the brake and the depression of the accelerator, the vehicle starts. Similar to the case as shown in FIG. 5, the first clutch 10 is maintained in the coupled state while the engine is automatically stopped.

That is, in general, when a range of an automatic transmission is switched from the D-range to the N-range, friction elements are released due to an operating pressure being evacuated from a manual valve, and, in such case, when the range is changed back to the D-range, a friction element to be coupled for the first gear (the first clutch 10 in this embodiment) is re-coupled. However, in this embodiment, as described above, even when the switching operation from the D-range to the N-range is performed while the engine is automatically stopped, the first clutch 10 is maintained in the coupled state. Therefore, the response delay when the vehicle starts and the shock are prevented from being caused, similar to the case of the control shown in FIG. 5.

Note that, as illustrated in the hydraulic control circuit 100 shown in FIG. 3, the operation is actualized by connecting the electric pump 101 directly to the shift valve 106 through the line 107 without passing through the manual valve 102, which makes it possible to supply the operating pressure from the electric pump 101 to the first clutch 10 without an influence from the operation of the manual valve 102 which accompanies the change of the range to the N-range.

Figure 7:
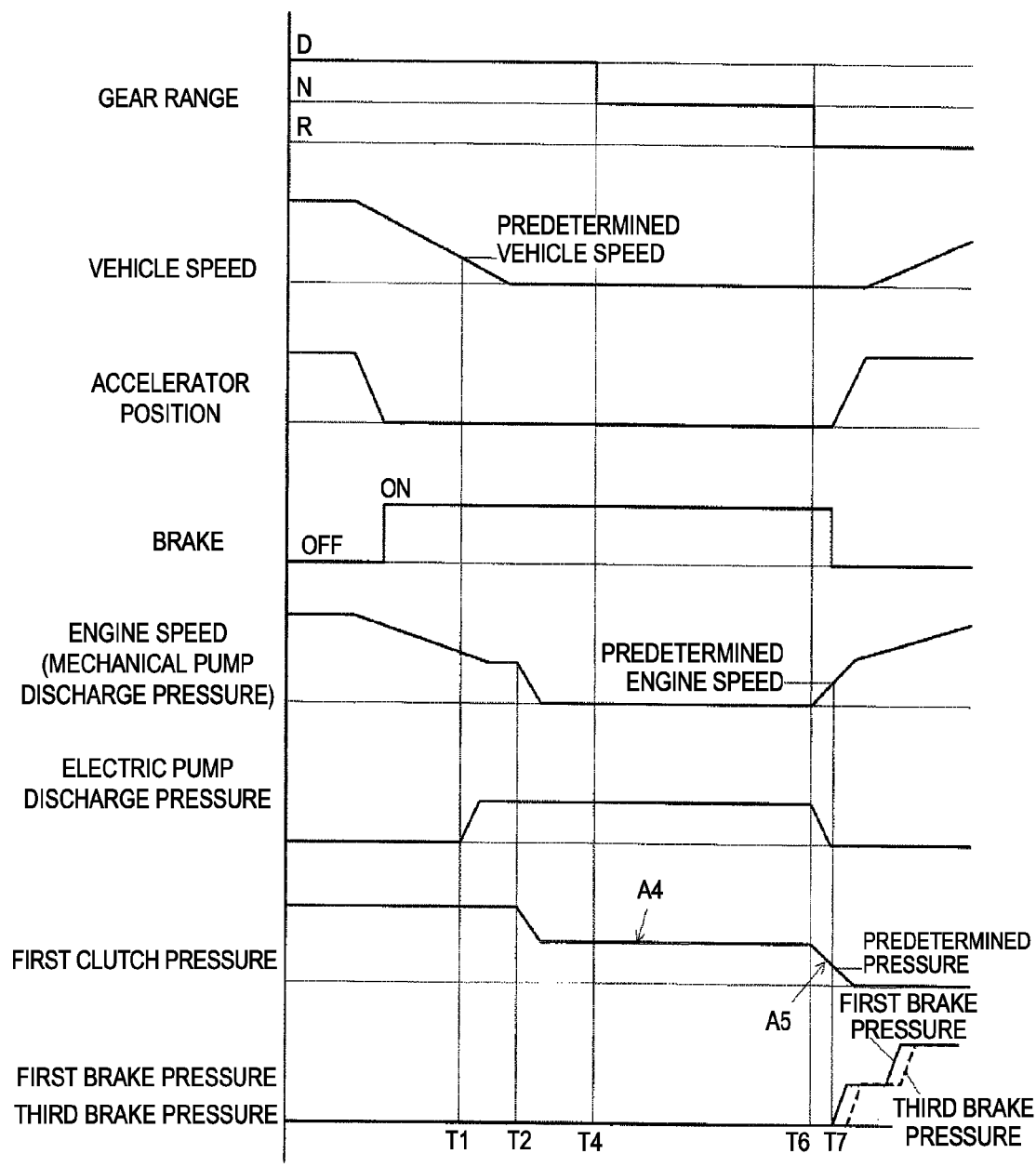
FIG. 7 is a timing chart showing a third operation in the idle-stop mode.

Next, an operation shown in FIG. 7 is a case where the vehicle is stopped while the D-range is being selected, and after the engine stops automatically, the vehicle's operator performs a switching operation from the D-range to the R-range through the N-range in order to start the vehicle in the reverse. In this case also, the electric pump 101 starts to operate at the timing T1, then the engine stops at the timing T2, and, thus, alternative to the mechanical pump 6, the operating pressure from the electric pump 101 is supplied as the first clutch pressure to the first clutch 10.

Subsequently, at the timing T4, the switching operation from the D-range to the N-range is performed, and, as indicated by the symbol A4 in FIG. 7, the supply of the first clutch pressure is continued even after switching to the N-range and, thus, the first clutch 10 is maintained in the coupled state. While this being similar to the operation shown in FIG. 6, the switching operation from the N-range to the R-range is performed to be recognized as the engine restart condition, and, thus, at a timing T6 where the above switching operation is performed, the engine is restarted and the mechanical pump 6 starts to operate again.

In this operation, after the engine is restarted, the vehicle starts in the reverse gear, therefore, at the timing T6, the first clutch 10 is released and at the same time the operating pressure generated by the mechanical pump 6 is supplied from the manual valve 102, through the lines 110 through 112, and to the first brake 70 and the third brake 90 as a first brake pressure and a third brake pressure, respectively.

In such case, at the timing T6 where the engine is restarted, the electric pump 101 stops and the first clutch pressure is evacuated from the first clutch 10; however, due to the need of releasing the first clutch 10 surely and swiftly, the evacuation of the first clutch pressure indicated by the symbol A5 is performed by the first linear solenoid valve 121 arranged on the line 109 within the hydraulic control circuit 100 shown in FIG. 3.

Subsequently, at a timing T7 where the rotation speed of the restarted engine reaches a predetermined rotation speed or when the first clutch pressure decreases to a predetermined pressure, a supply control for the first and third brake pressures is started, and therefore, the automatic transmission is switched from the first gear state where the first clutch 10 is coupled to the reverse state where the first brake 70 and the third brake 90 are coupled.

In such a case, a timing to start supplying the first and third brake pressures and a state of the increased hydraulic pressure are appropriately controlled by the second and third linear solenoid valves 122 and 123 arranged on the lines 111 and 112, respectively. For example, at the timing where the first clutch pressure decreases to the predetermined pressure, the supply of the first brake pressure is started and, then, the supply of the third brake pressure is started in succession.

In this manner, when the switching operation to the R-range is performed, the first clutch 10 is surely and swiftly released and, at the same time, the coupling timings for the first brake 70 and the third brake 90 are appropriately controlled, and, therefore, the automatic transmission 1 shifts from the neutral state to the reverse state swiftly and smoothly.

Figure 8:
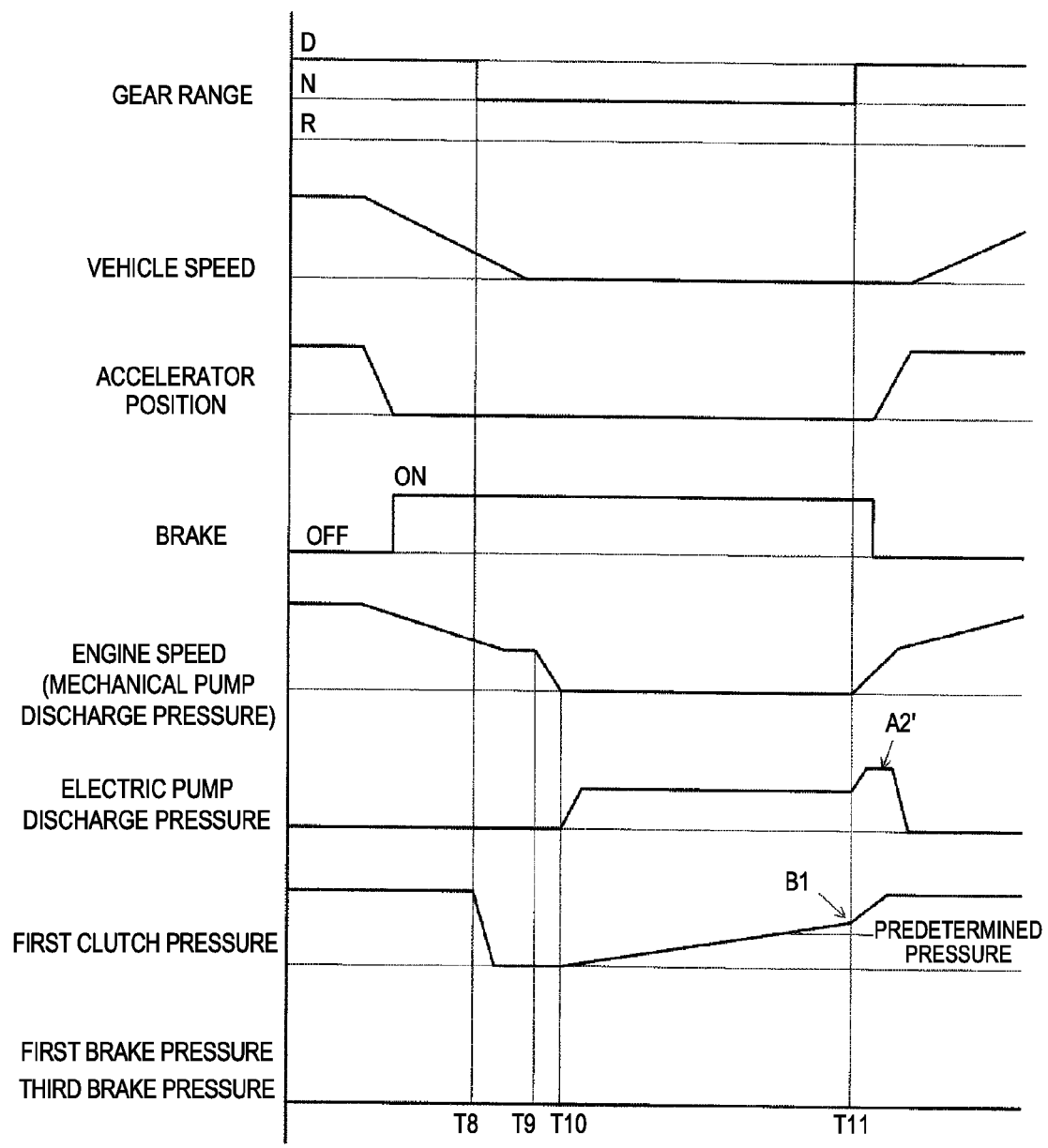
FIG. 8 is a timing chart showing a fourth operation in the idle-stop mode.
Figure 9:
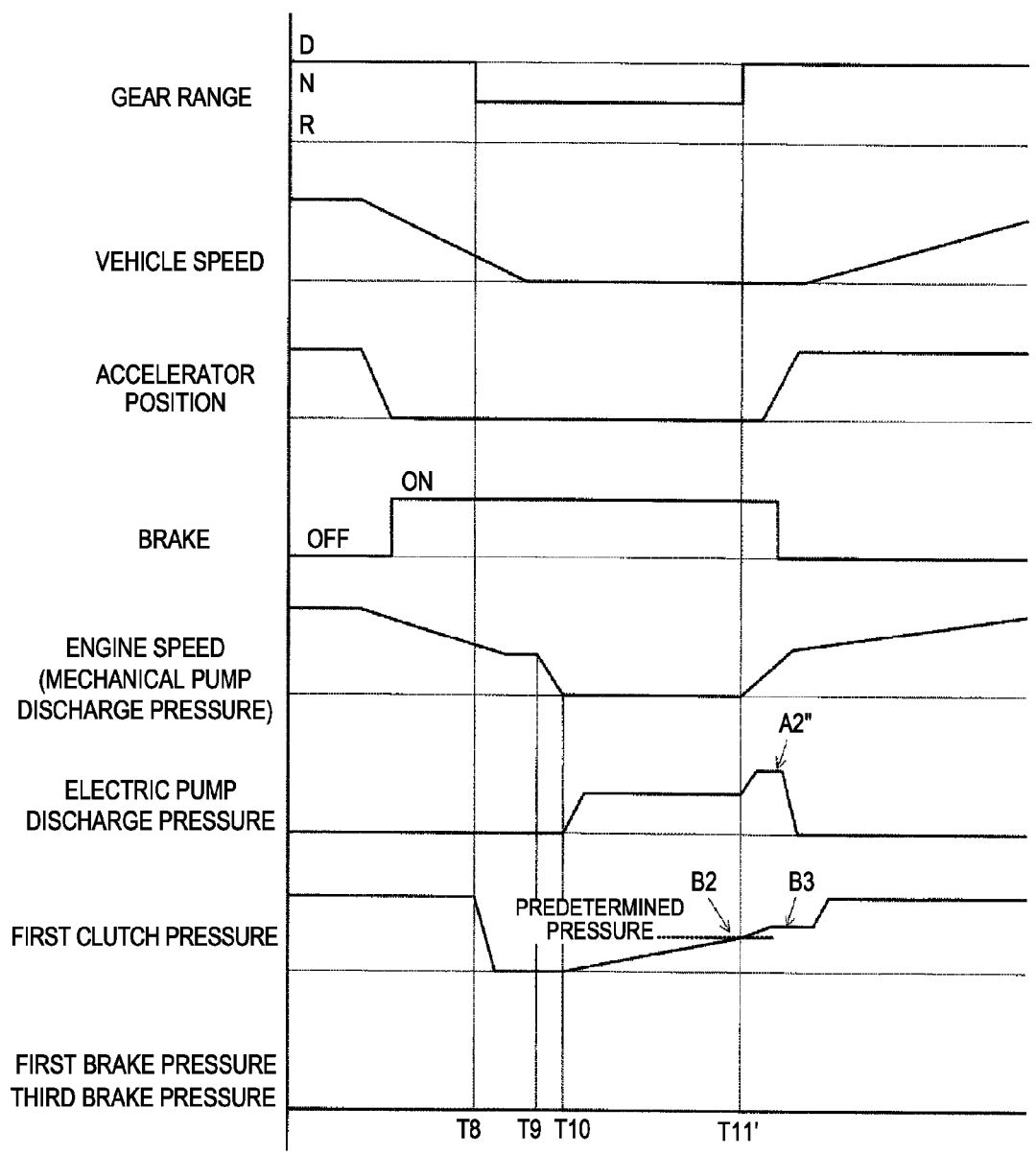
FIG. 9 is a timing chart showing another state of the operation shown in FIG. 8.

On the other hand, operations shown in FIGS. 8 and 9 are cases where the vehicle's operator performs the switching operation from the D-range to the N-range while the vehicle is stopped and before the engine is automatically stopped. In this operation, due to the manual valve 102 moving to the N-range position in the state where the mechanical pump 6 is actuated by the engine, that is, the state where the spool within the shift valve 106 in the hydraulic control circuit 100 is at the first location, at the timing T8, the switching operation to the N-range is performed, the operating pressure supplied to the first clutch 10 is evacuated from the manual valve 102 through the shift valve 106, and thus the first clutch 10 is released.

Then, if the predetermined engine automatic stop conditions are satisfied, the engine automatically stops at a timing T9, and just after the electric pump 101 starts to operate at a timing T10, and a control is started in which the operating pressure generated by the electric pump 101 is supplied to the first clutch 10 through the shift valve 106 within which the spool is moved to the second position due to the mechanical pump 6 being stopped, and thus the temporarily released first clutch 10 is re-coupled.

Further, in this operation, the switching operation from the N-range to the D-range is recognized as the engine restart condition, and thus, at a timing T11 where the switching operation is performed, the engine is restarted and the mechanical pump 6 correspondingly starts to operate, and thereby, the spool within the shift valve 106 moves to the first position, and the operating pressure from the mechanical pump 6 is supplied to the clutch 10 as the first clutch pressure.

Meanwhile, at the timing T11 where the pressure supplying pump for the first clutch pressure to the first clutch 10 is replaced by the mechanical pump 6 from the electric pump 101, unless the first clutch pressure is increased to a certain level by the electric pump 101, the first clutch pressure may increase suddenly when the mechanical pump 6 replaces it, causing the first clutch 10 to be coupled abruptly, and, thereby, may cause a shock.

In other words, due to the mechanical pump 6 needing to supply the operating pressure for the automatic transmission 1 entirely, the mechanical pump 6 is designed with a sufficiently large volume, and on the other hand, the electric pump 101 is designed exclusively for the first clutch 10 and, therefore, has a relatively smaller volume compared to the mechanical pump 6. Moreover, at the timing T10, which is after the first clutch pressure is evacuated and after the engine is automatically stopped, the electric pump 101 starts to operate, therefore, there is a case where the first clutch pressure is not increased sufficiently at the timing T11 where the pump is switched to the mechanical pump 6. When the pump is switched to the mechanical pump 6 in this state, the first clutch pressure increases suddenly, and thus causes the first clutch 10 to couple abruptly, and thereby, may cause a shock.

Therefore, in the operations shown in FIGS. 8 and 9, at the timing T11 where the switching operation from the N-range to the D-range is performed, the first clutch pressure is detected by the first clutch pressure sensor 205 shown in FIG. 4 in order to determine whether the hydraulic pressure has reached the predetermined pressure. The predetermined pressure is set to be equal or lower than the hydraulic pressure for the electric pump 101 to produce the first clutch pressure when replacing the mechanical pump 6 without having the first clutch pressure being evacuated (the pressure indicated by the symbol A1, A3, and A4 in FIGS. 5-7) when the engine is automatically stopped in the D-range.

Then, when the first clutch pressure at the timing T11, where the switching operation from the N-range to the D-range is performed, reaches the predetermined pressure as indicated by the symbol B1 in FIG. 8, upon increasing the rotation speed of the electric pump 101 temporarily so as to swiftly increase the first clutch pressure (indicated by the symbol A2'), the discharged pressure of the mechanical pump 6 is directly supplied to the first clutch 10.

On the other hand, as indicated by the symbol B2 in FIG. 9, if, because the switching operation from the N-range to the D-range is performed at a comparatively early timing, the first clutch pressure does not reach the predetermined pressure at the timing T11' for the switching operation, upon raising the rotation speed of the electric pump 101 temporarily (indicated by the symbol A2") similar to the above, an increase of the operating pressure from the mechanical pump 6 is suppressed by the first linear solenoid valve 121 arranged on the line 109 communicating with the first clutch 10 so as to supply the operating pressure to the first clutch 10 over a predetermined time period. Thus the shock from the coupling of the first clutch 10 due to the sudden increase in the first clutch pressure is suppressed.

Figure 10:
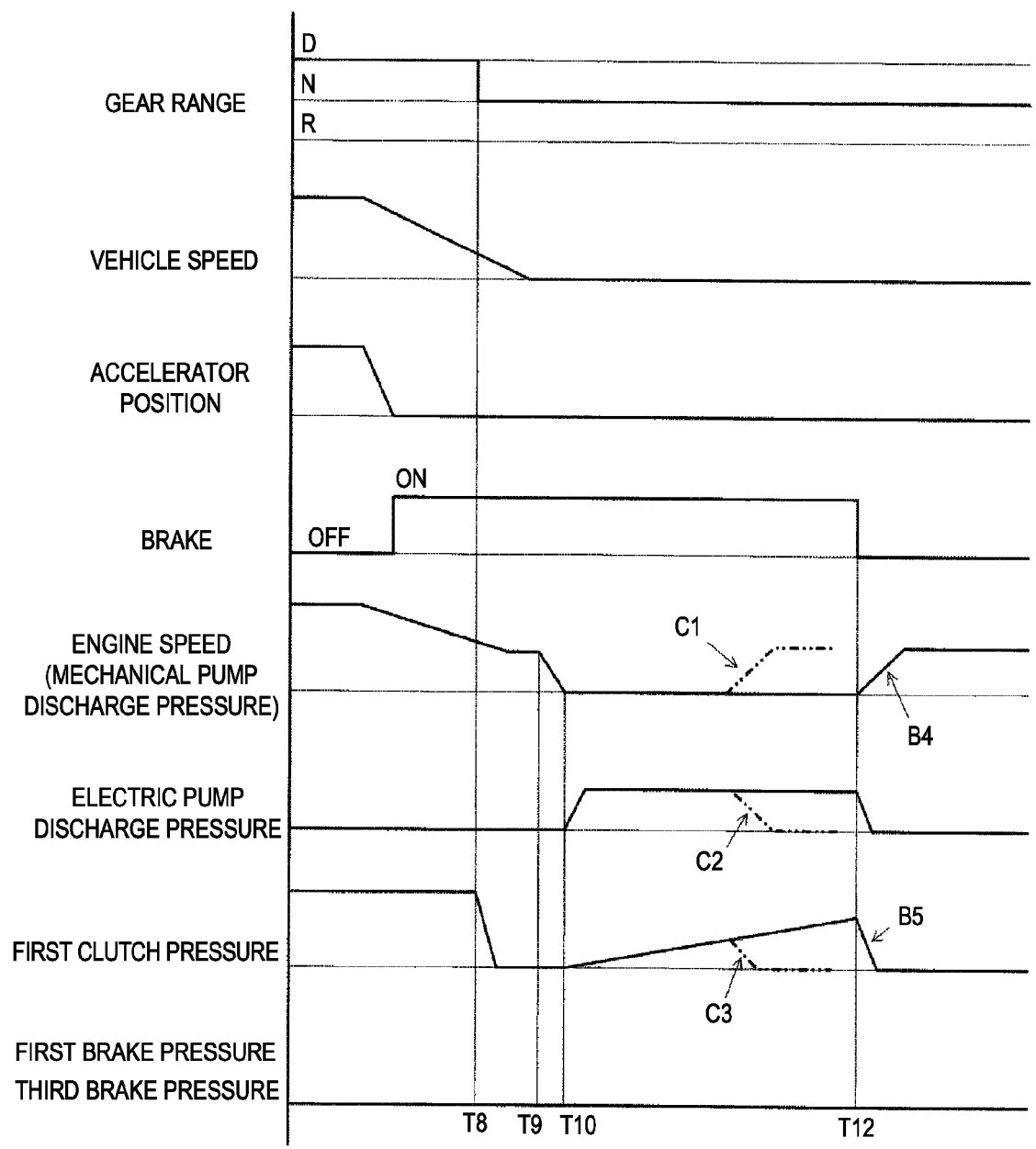
FIG. 10 is a timing chart showing a fifth operation in the idle-stop mode.

Further, the operation shown in FIG. 10 is, similar to FIGS. 8 and 9, a case where the vehicle's operator performs the switching operation from the D-range to the N-range while the vehicle is stopped and before the engine is automatically stopped; however, the switching operation back to the D-range is not performed here and the engine is restarted while the range remains in the N-range. In this case, before the engine automatic stop, firstly with the spool within the shift valve 106 of the hydraulic control circuit 100 being at the first position and the manual valve 102 moving to the N-range position, the first clutch pressure is evacuated from the manual valve 102 at the timing T8 where the switching operation to the N-range is performed, and the first clutch 10 is released.

Then, subsequently, the engine is automatically stopped at the timing T9, the electric pump 101 starts to operate at the timing T10, and the first clutch pressure is supplied to the first clutch 10 again. The operation up to this point is the same as those shown in FIGS. 8 and 9.

Thereafter, according to FIG. 10, the switching operation from the N-range to the D-range is not performed, and at a timing T12, the depression of the brake is released to be recognized as the engine restart condition, and at this timing T12, as indicated by the symbol B4, the engine is automatically restarted while the range is maintained in the N-range. Further, corresponding to the engine being restarted, the electric pump 101 is stopped at this timing T12.

At this point, while the first clutch pressure is stopped from being supplied due to the electric pump 101 being stopped, a failure may occur that if the engine is restarted before the operating pressure is evacuated from the first clutch 10, the vehicle may start while in the N-range. Therefore, in this case, by utilizing the first linear solenoid valve 121 within the hydraulic control circuit 100, the first clutch pressure is swiftly evacuated as indicated by the symbol B5. As a result, the first clutch 10 is released swiftly, and the failure of the vehicle starting within the N-range when the engine is restarted is resolved.

Because the mechanical pump 6 starts to operate corresponding to a restart of the engine, the spool within the shift valve 106 is moved to the first position, however, because the manual valve 102 is in the N-range position, the operating pressure from the mechanical pump 6 is not supplied to the first clutch 10, and thus, at the timing T12 and thereafter, the engine operates while the transmission is in the neutral state.

Note that, when a case occurs where the idling stop control should be prohibited, for example, the charge level of the battery becomes a predetermined level or lower prior to the timing T12 where the engine is automatically restarted, the engine is restarted at this timing as indicated by the symbol C1.

In this case, in order to restart the engine quickly, a control is performed in which the electric pump 101 is stopped and, at the same time, the first clutch pressure is swiftly evacuated through the linear solenoid valve 121 as indicated by the symbols C2 and C3 so that the engine is restarted while the first clutch 10 is in the released state.

Meanwhile, in the control of evacuating the first clutch pressure by the first linear solenoid valve 121 while the electric pump 101 is stopped before the start of the engine, when the valve 121 fails and the first clutch pressure cannot be evacuated, because the electric pump 101 is not expected to evacuate the hydraulic fluid, a case may occur where the first clutch pressure is impossible to be evacuated.

In this case, in the hydraulic control circuit 100 illustrated in FIG. 3, due to the pressure exhaust circuit 113 provided on the line 107 on the discharge side of the electric pump 101, the first clutch pressure is evacuated from the pressure exhaust circuit 113 and, thereby, the first clutch 10 is released. At this point, because the orifice 114 is arranged on the pressure exhaust circuit 113, the discharged hydraulic fluid flows out from the pressure exhaust circuit 113 while the electric pump 101 is in operation, and thereby, the operating pressure increases.

The operations described above are achieved through the control by the control unit 200 illustrated in FIG. 4. Next, the control operations by the control unit 200 are described with reference to flowcharts as illustrated in FIGS. 11A to 11C and 12A to 12C.

Figure 11A:
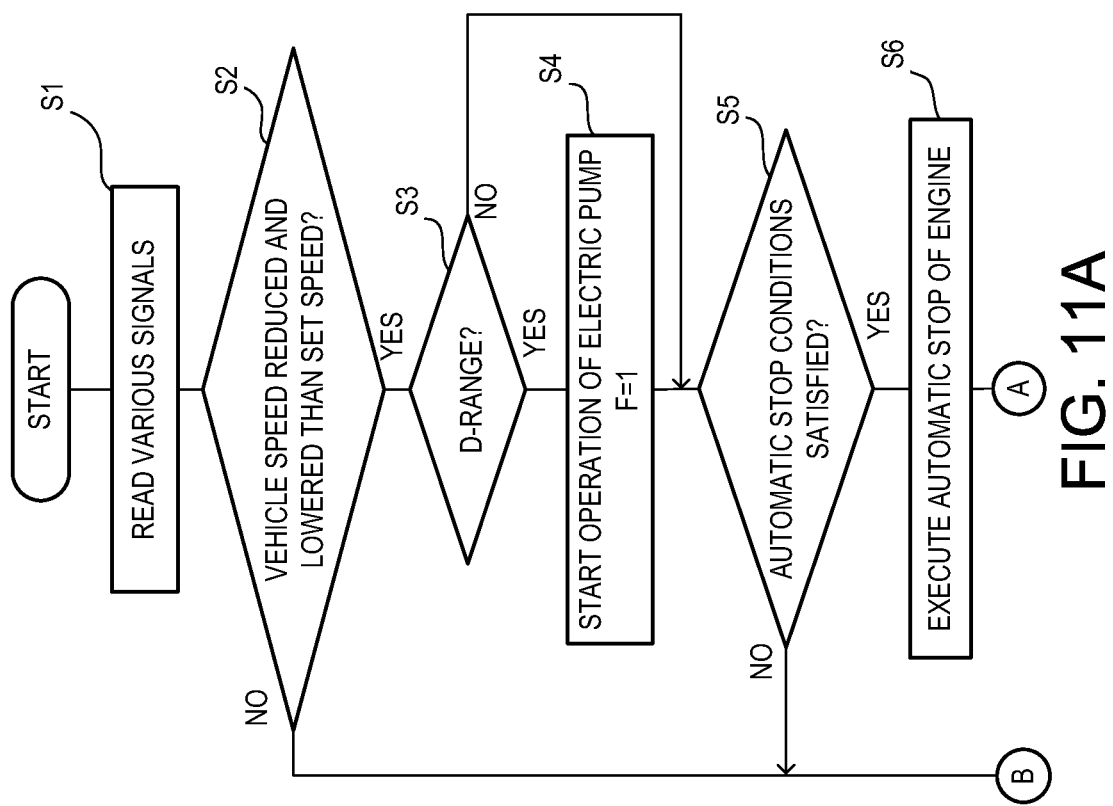
FIGS. 11A to 11C show a flowchart of an example control of the first embodiment.
Figure 11B:
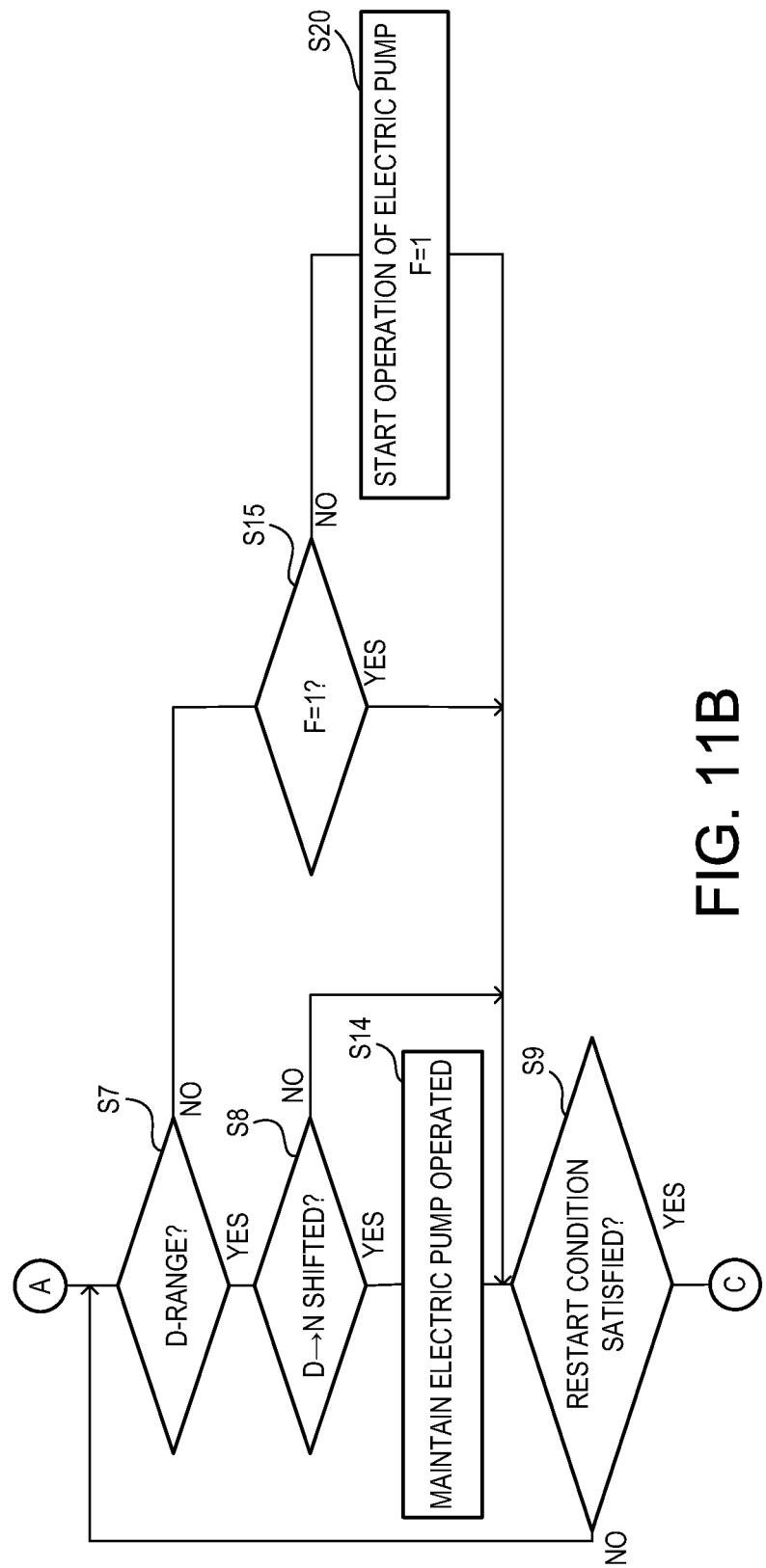
Figure 11C:
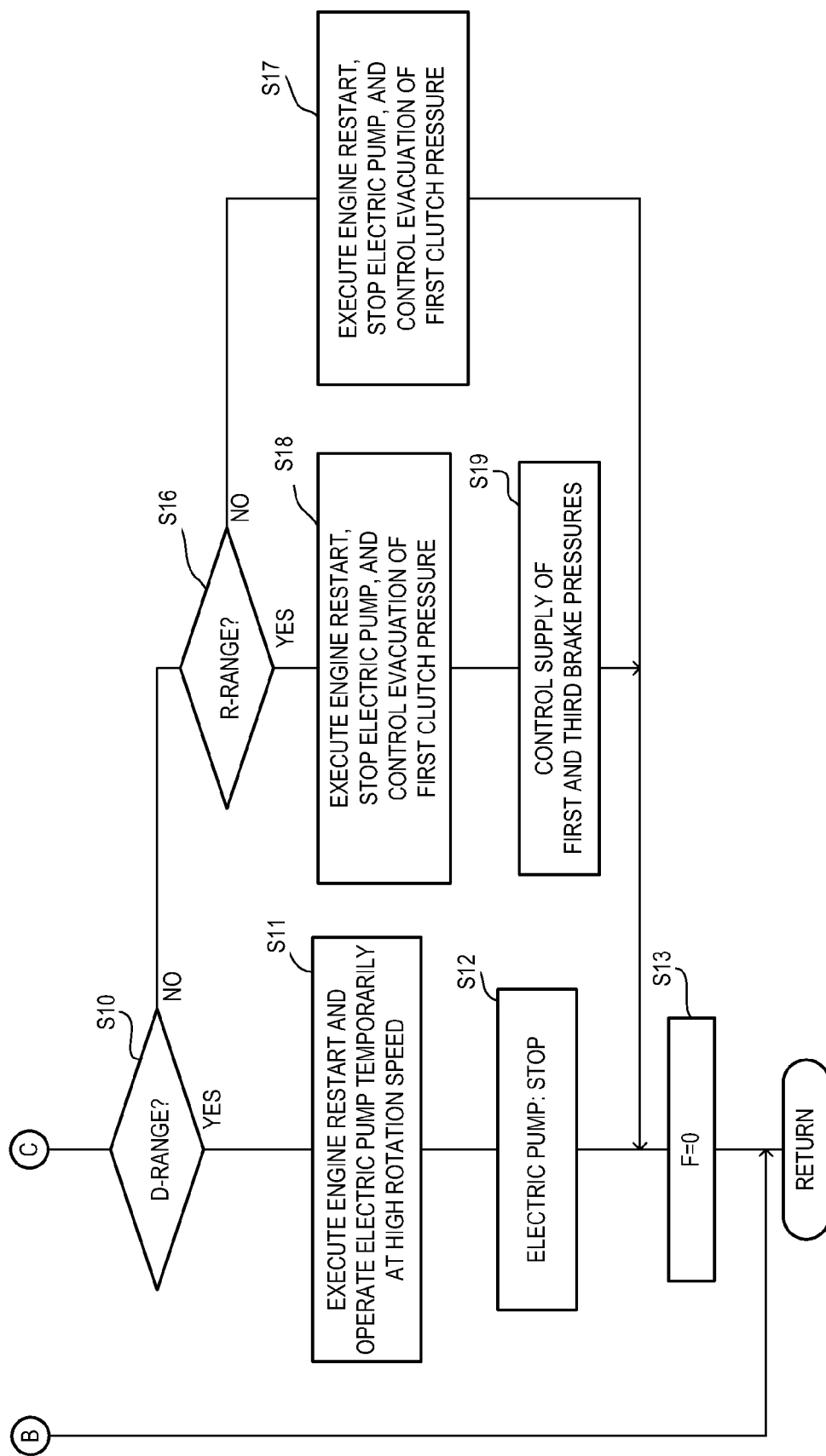

The flowchart as shown in FIGS. 11A to 11C is an example of a basic control of this embodiment. First, at Step S1, the signals from the various sensors 201, 202, 204, 205, 206 and 207 and the switch 203 shown in FIG. 4 are read, and at Step S2, a determination whether the vehicle is currently decelerating and the vehicle speed is reduced to a set speed or lower is performed. When the vehicle is not decelerating or the vehicle speed is above the set speed, the following control of the engine automatic stop is not performed.

On the other hand, when the vehicle is decelerating and the vehicle speed is reduced to the set speed or lower, at a subsequent Step S3, it is determined whether the current range of the automatic transmission 1 is the D-range, and when the range is determined to be the D-range, at Step S4, the operation of the electric pump 101 is started and, at the same time, a flag F is set to "1" indicating that the electric pump 101 is actuated.

Next, at Step S5, a determination whether the predetermined engine automatic stop conditions, such as the vehicle speed is reduced or the brake is depressed, are satisfied are performed. When the conditions are satisfied, at Step S6, the control of the engine automatic stop as described above is executed.

Further, after the control of the engine automatic stop, at Step S7, the determination whether the range of the automatic transmission 1 is the D-range is performed. When the range is determined to be the D-range, at a subsequent Step S8, a determination whether the range is switched from the D-range to the N-range is performed, and, when the range is not switched, at Step S9, a determination whether the predetermined engine restart condition, such as the brake is released, is satisfied is performed.

When the restart condition is satisfied, at Step S10, a determination whether the range right after is the D-range is performed, and when the range is the D-range, at Step S11, the control of the engine restart is executed and, at the same time, the electric pump is actuated temporarily at a high rotation speed to increase the first clutch pressure to reach the hydraulic pressure required for the vehicle to start (see the symbol A2 in FIG. 5), and then, at Step S12, the electric pump 101 is stopped.

Thereby, the role of the electric pump 101 is finished, the state of the transmission shifts to the state where the first clutch 10 is coupled by the first clutch pressure generated by the operation of the mechanical pump 6 corresponding to the start of the engine, and the vehicle starts in this state. Then, at Step S13, the flag F is reset to "0" for the next control. Note that, the above described operation corresponds to the operation as illustrated by the timing chart in FIG. 5.

Alternatively, when the switching from the D-range to the N-range is determined after the automatic stop and before the restart of the engine at Step S8, the electric pump 101 is maintained to be operated at Step S14, and the step proceeds to Step S9, then to the Step S7, and further to Step S15 to determine whether the flag F is "1". Here, because the flag F is set to "1" in advance at Step S4, Step S9 is performed again to wait for the restart condition to be satisfied.

When the restart condition is satisfied, the determination whether the range right after is the D-range is performed at Step S10. When the range is the D-range, that is the restart condition is satisfied due to the range being switched to the D-range, Steps S11 to S13 are performed, and, similar to the above, the electric pump 101 is temporarily controlled at the high rotation speed and then stopped, the first clutch is shifted to the state of being coupled by the first clutch pressure generated by the operation of the mechanical pump 6 corresponding to the start of the engine, and the vehicle starts in this state. Note that, the above described operation corresponds to the operation as illustrated by the timing chart in FIG. 6.

On the other hand, when the restart condition is satisfied due to a reason other than being switched back to the D-range, Steps S10 to S16 are performed and a determination whether the range is the R-range is performed; however, here the range is switched to the N-range, therefore, Step S17 is further performed to perform the control of restarting the engine, at the same time, stopping the electric pump 101, and, through the first linear solenoid valve 121 illustrated in FIG. 3, evacuating the first clutch pressure.

That is, if the first clutch 10 is coupled, when the engine is restarted, the vehicle starts in the N-range and, thereby, causes uncomfortable feeling to the vehicle's operator. Therefore, in this case, the first clutch 10 is swiftly released along with the restart of the engine.

Further, when the restart condition is determined to be satisfied at Step S9 due to the switching from the N-range to the R-range, or when the restart condition is satisfied due to the engine automatically stopping in the D-range and then the range being switched to the R-range without being switched to the N-range, Steps S16 to S18 are performed, in which the engine is restarted, at the same time, the electric pump 101 is stopped, and the first clutch pressure is evacuated. Further, at Step S19, the control of supplying the first and third brake pressures to the first and third brakes 70 and 90, respectively, is preformed.

The controls of evacuating and supplying the above operating pressures are performed by the first through third linear solenoid valves 121, 121 and 123 so that shift into the reverse gear is smoothly achieved while avoiding an interlocking due to the coupling of the first clutch 10 and the first and thirst brakes 70 and 90 interfering with each other. Note that, the above described operation corresponds to the operation as illustrated by the timing chart in FIG. 7.

Further, when the vehicle is currently decelerating and the vehicle speed is determined to be at the set speed or lower at Step S2, and further when the automatic transmission 1 is determined to be not in the D-range currently at Step S3 (i.e., the automatic transmission 1 is determined to be in the N-range because the engine automatic stop control is performed under the precondition where the vehicle is stopped after traveling forward), the control of starting the operation of the electric pump 101 at Step S4 is not performed.

That is, the operation of the electric pump 101 does not start when the range is switched from the D-range to the N-range before the engine automatically stops. This is because, if the electric pump is actuated before the engine stops, the coupled state of the clutch 10 is maintained to generate a driving force to the vehicle regardless of the switching to the N-range, and, as a result, causes an uncomfortable feeling to the vehicle's operator.

After determining that the automatic stop conditions are satisfied and the automatic stop of the engine is executed at Steps S5 and S6, Steps S7 to S15 are performed due to the range not being the D-range. Because the flag F is "0" at this point, a subsequent Step S20 is performed, in which the operation of the electric pump 101 is started and the flag F is set to "1".

Next, when the engine restart condition is satisfied, either of the controls at Steps S11 to S13, the control at Step S17, or the controls at Steps S18 and S19 is/are performed according the range at this point being D, N or R-range.

Figure 12A:
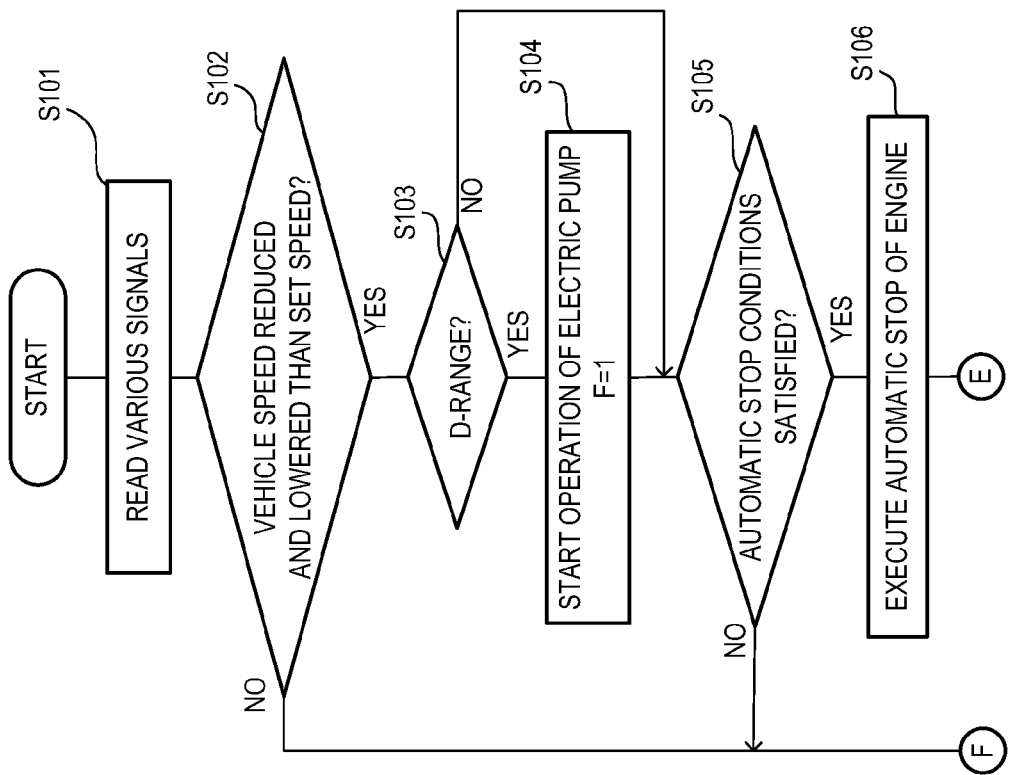
FIGS. 12A to 12C show a flowchart of another example control of the first embodiment.
Figure 12B:
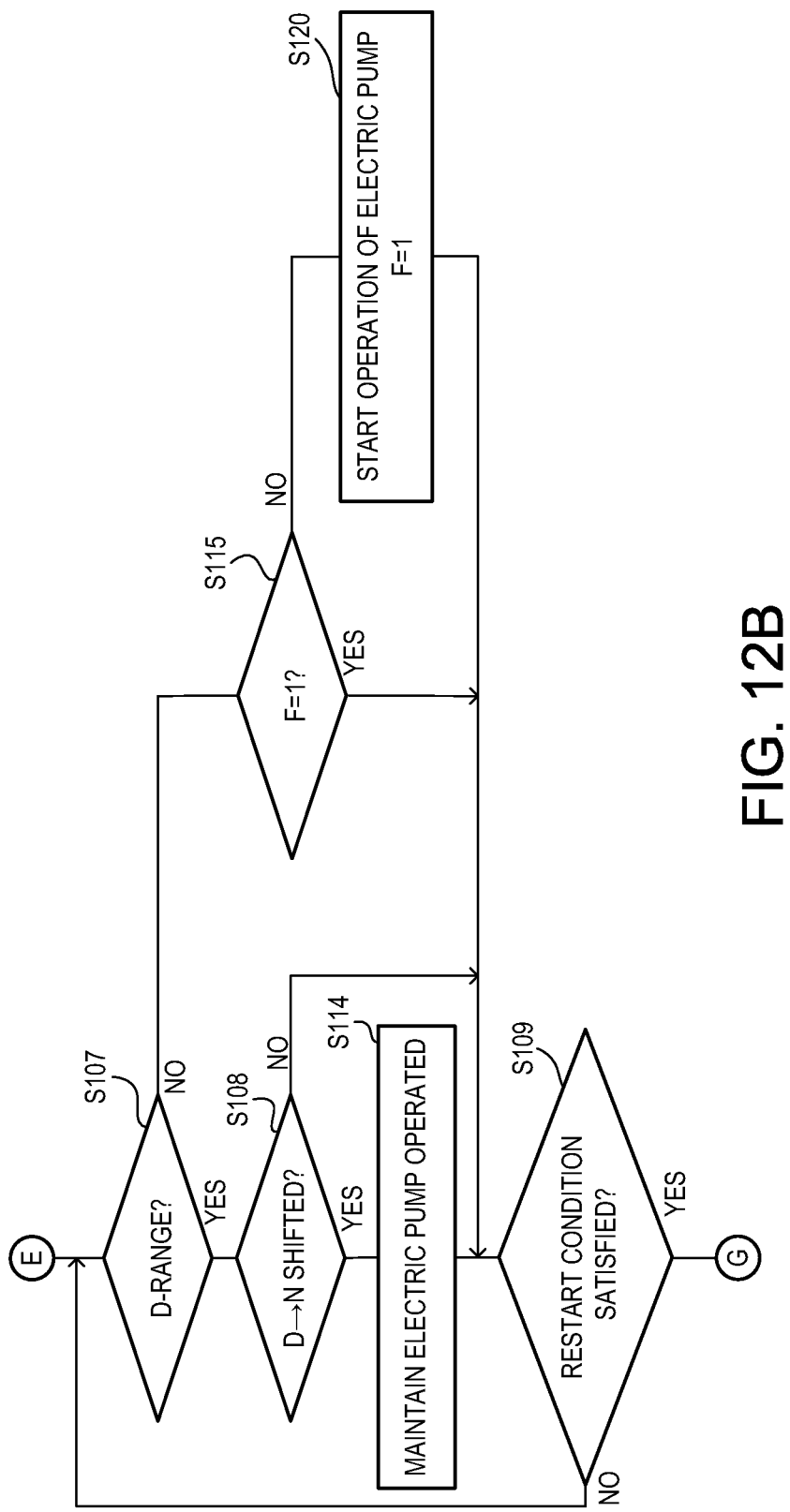
Figure 12C:
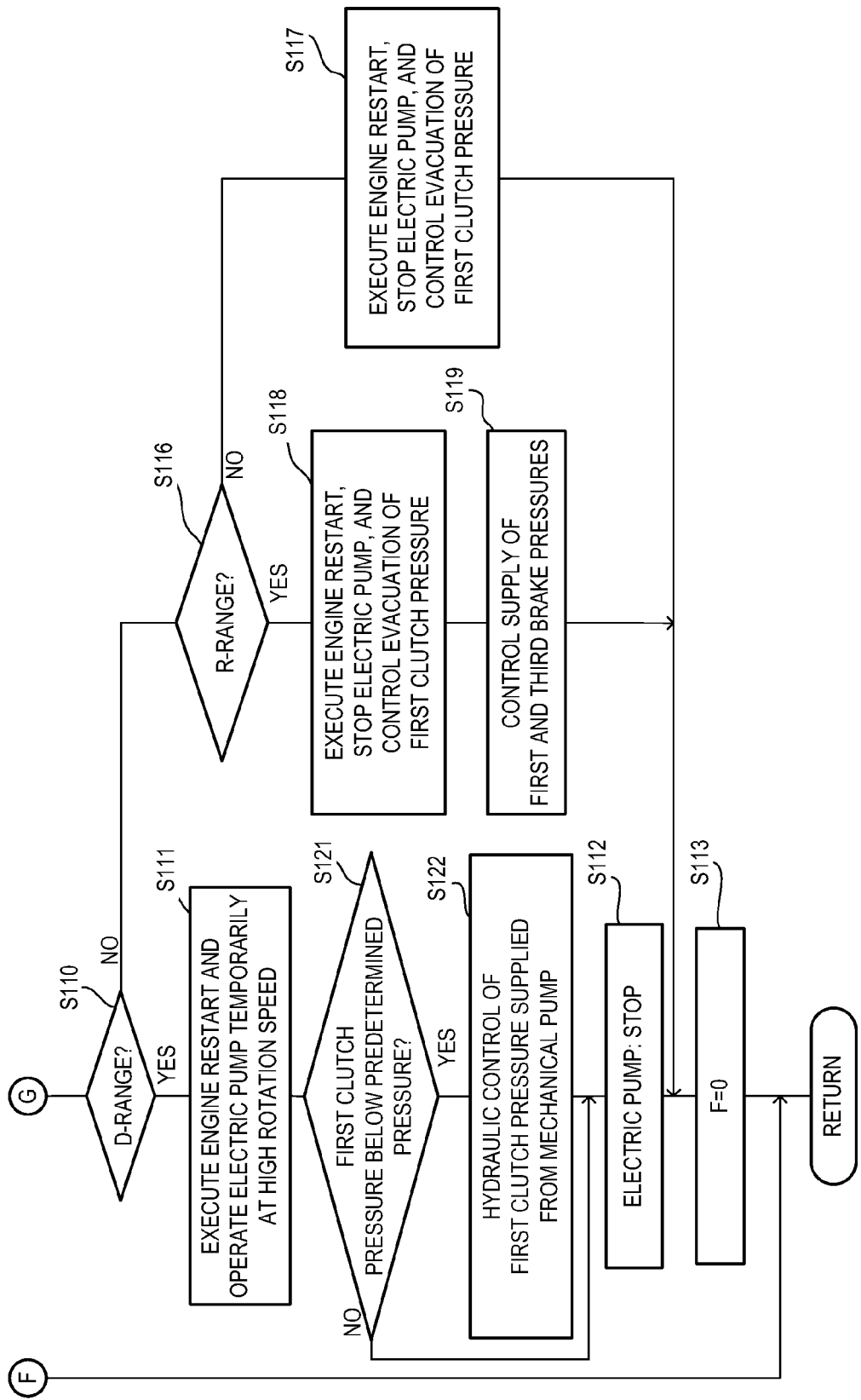

Next, another example control as indicated by the flowchart in FIGS. 12A to 12C in this embodiment is described. In this example control, the operations at the time of restarting the engine as shown in FIGS. 8 and 9 are performed in addition to the operations of the example of the basic control as shown in FIGS. 11A to 11C; however, the operations except for the above are the same as the example of the basic control. In the flowchart in FIGS. 12A to 12C, in addition to Steps S101 to S120 which are exactly the same as Steps S1 to S20 indicated by the flowchart in FIGS. 11A to 11C, Steps S121 and S122 are added.

That is, in this example control, the engine restart condition is determined to be satisfied at Step S109, and when the range of the automatic transmission 1 is determined to be the D-range at Step S110, the engine restart control is executed at Step S111 and further, after the electric pump 101 is temporarily operated at the high rotation speed, the determination of whether the first clutch pressure is below the predetermined level is performed at Step S121.

The predetermined pressure is the same as the one described above with reference to FIGS. 8 and 9. That is, in the case where the engine automatically stops in the state of the D-range, the predetermined pressure is set to be equal or lower than the hydraulic pressure of the first clutch pressure produced by the electric pump 101 in replacement of the mechanical pump 6. Therefore, the first clutch pressure does not fall below the predetermined pressure when the engine automatically stops in the state of the D-range.

On the other hand, in a case where after the switching operation from the D-range to the N-range is performed before the engine automatic stop and the first clutch pressure is temporarily evacuated at this point, the engine automatically stops and the operation of the electric pump 101 is started to restart the supply of the first clutch pressure, the first clutch pressure may not reach the predetermined pressure by the time of the restart of the engine.

Thus, at Step S121, the determination of whether the first clutch pressure is below the predetermined pressure at the time of the restart of the engine is performed. If the predetermined pressure is reached, a control for the raising of the operating pressure supplied from the mechanical pump 6 is not performed, and if the predetermined pressure is not reached, at Step S122, the increase of the operating pressure from the mechanical pump 6 is suppressed by the first solenoid valve 121 arranged on the line 109 communicating with the first clutch 10 as shown in FIG. 3, and the first clutch 10 is controlled to be supplied with the operating pressure for a predetermined time period.

Thereby, the shock caused by the sudden increase of the first clutch pressure at the time of coupling the first clutch 10 is suppressed. In this suppressing control, when the first clutch pressure is the predetermined pressure or above, the operation corresponds to the operation as shown in FIG. 8, and when the first clutch pressure is below the predetermined pressure, the operation corresponds to the operation as shown in FIG. 9.

Then, similar to the example of the basic control as shown in FIGS. 11A to 11C, the electric pump 101 is stopped at Step S112, and the flag F is reset to "0" at Step S113 to finish the control.

Figure 13:
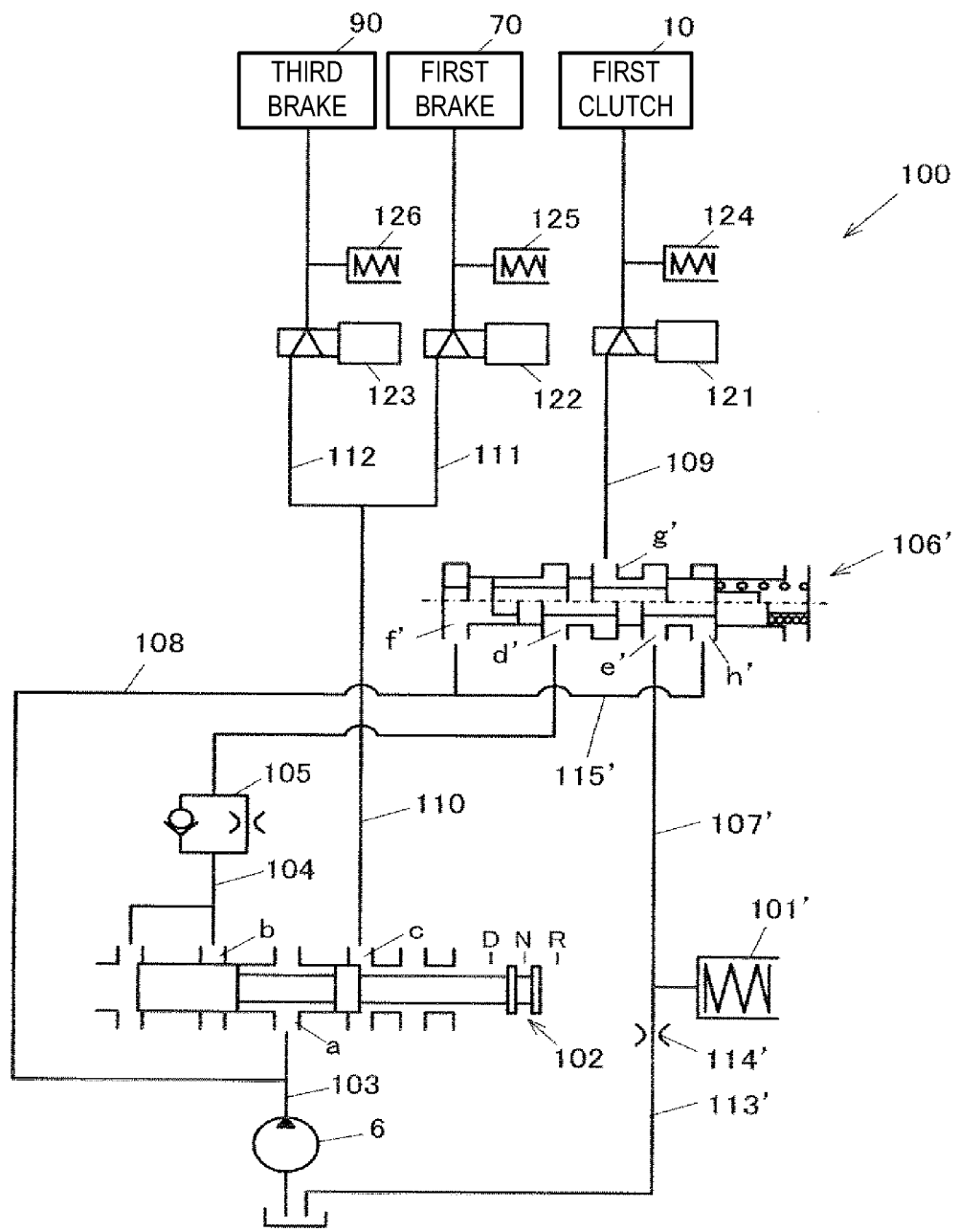
FIG. 13 is a circuit diagram of a substantial part of a hydraulic control circuit according to a second embodiment of the present invention.

Next, a second embodiment of the present invention as shown in FIG. 13 is described in detail. Note that, a configuration of an automatic transmission 1 of this embodiment is similar to the one in the first embodiment, and components similar to those of the first embodiment are described by using the same numerals, respectively.

In this embodiment, an accumulator 101' is utilized as a hydraulic pressure generating means instead of the electric pump 101, and a line 107' on a discharge side of the accumulator 101' is connected with a port e' of a shift valve 106'.

A port h' for a pressure accumulation of the accumulator 101' is provided to the shift valve 106', and when a spool of the valve 106' is located at the first position, the port e' is communicated with the port h'. Further, the port h' is connected with a line 115' branched from the line 108 for introducing the discharged pressure of the mechanical pump 6 into a control port f' of the shift valve 106'.

Therefore, when the mechanical pump 6 is in operation while the engine is in operation, the discharged pressure of the pump 6 is introduced into the control port f' through the line 108 and the spool of the shift valve 106' is located to the first position. Thereby, the port e' and the port h' of the shift valve 106' are communicated with each other, and the discharged pressure of the pump 6 which is supplied from the line 115' branched from the line 108 is introduced into the accumulator 101' through the ports h' and e' of the shift valve 106' and the line 107 to be accumulated in the accumulator 101'.

Further, when the engine automatically stops and the discharged pressure of the mechanical pump 6 is stopped being supplied to the control port f' of the shift valve 106', the spool of the shift valve 106' moves to the second position, the port e' communicates with an output port g', and the hydraulic pressure accumulated in the accumulator 101' is supplied to the first clutch 10 as a first clutch pressure through the line 107', the shift valve 106' and the line 109.

Thereby, the hydraulic pressure generating means for supplying the operating pressure to be supplied to the first clutch 10 is automatically switched from the mechanical pump 6 actuated by the engine to the accumulator 107' while the engine is automatically stopped.

Therefore, further in this embodiment, the operations for operating the electric pump 101 instead of the mechanical pump 6 while the engine is stopped can be executed similar to the first embodiment. Note that, in the controls shown in FIGS. 5 to 7 in the first embodiment, the operation of the electric pump 101 is started before the engine is stopped (before the mechanical pump 6 is stopped); however, in the second embodiment utilizing the accumulator 101', the supply of the hydraulic pressure for the first clutch pressure by the accumulator 101' is started when the mechanical pump 6 is stopped.

Next, third to fifth embodiments of the present invention as shown in FIGS. 14 to 18 are described in detail. Note that, configurations of automatic transmissions and hydraulic control circuits according to the third to fifth embodiments are similar to the automatic transmission 1 and the hydraulic control circuit 100 of the first embodiment shown in FIGS. 1 to 3; each of the hydraulic control circuits of the third to fifth embodiments is equipped with the electric pump 101.

Further, each of configurations of control systems is basically similar to the configuration shown in FIG. 4; however, in addition, in the third to fifth embodiments, a first clutch pressure switch 205' (hereinafter, it may be referred to as "hydraulic switch") for switching itself ON when the first clutch pressure is the predetermined pressure or above is used instead of the first clutch pressure sensor 205. The predetermined pressure where the hydraulic switch 205' switches ON (hereinafter, it may be referred to as "the hydraulic pressure for switching ON") is set to the hydraulic pressure required to maintain the coupled state of the first clutch 10 while the engine is automatically stopped. Note that, in the descriptions below, the similar configurations to the first embodiment are expressed by using the same numerals.

Figure 14:
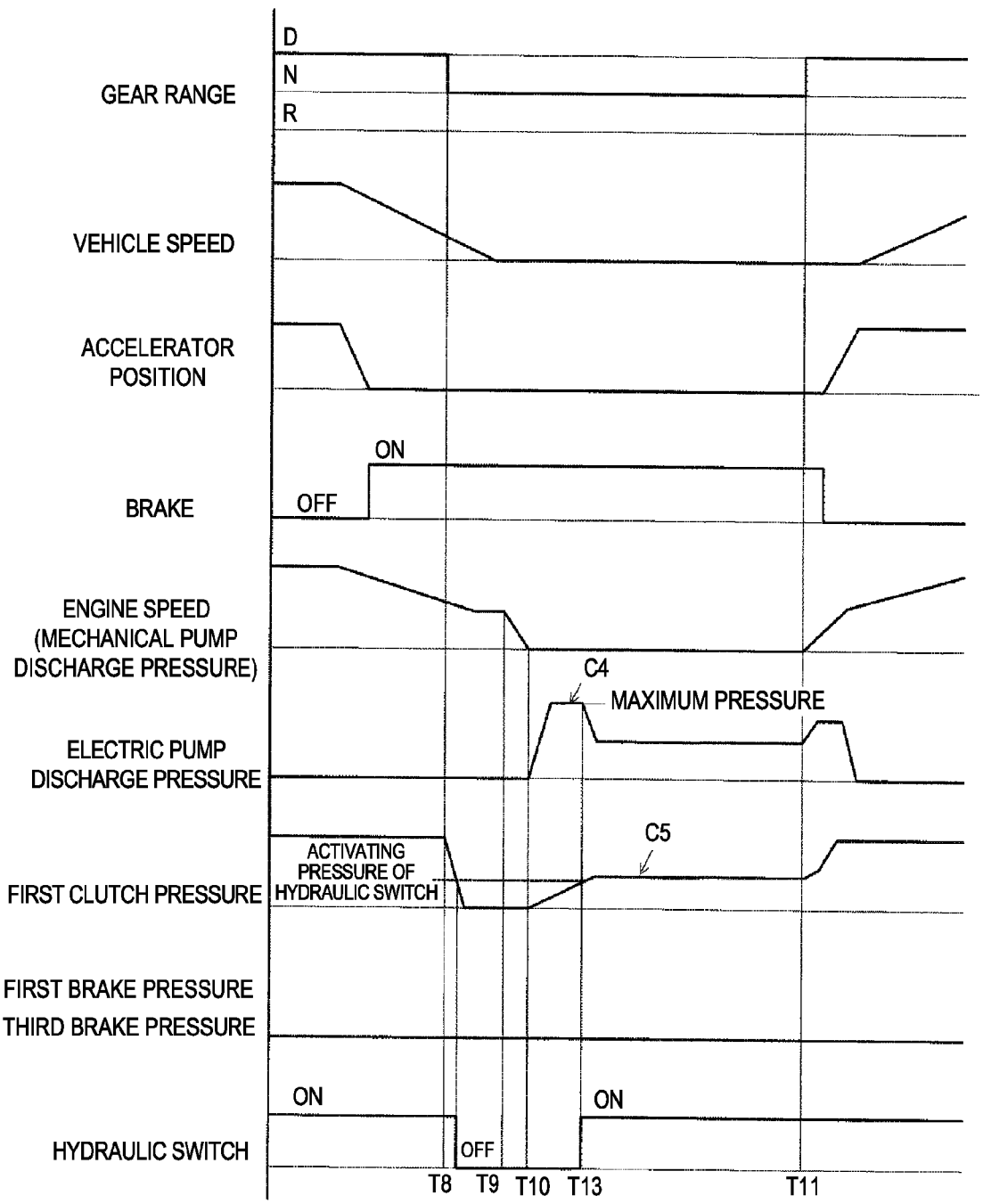
FIG. 14 is a timing chart showing an operation of a third embodiment of the present invention.

First, the operations in the third embodiment as indicated by the timing chart in FIG. 14 are described. The operation is, similar to the operations shown in FIGS. 8 to 10 according to the first embodiment, a case where a switching operation from the D-range to the N-range is performed before the engine automatic stop while the vehicle is stopped.

That is, at a timing T8 before the engine automatically stops, the switching operation from the D-range to the N-range is performed, the first clutch pressure supplied to the first clutch 10 is evacuated from the manual valve 102 through the shift valve 106 of the hydraulic control circuit 100, and, thereby, the first clutch 10 is released. Further, at the point where the first clutch pressure is decreased to be lower than the predetermined hydraulic pressure for switching ON, the hydraulic switch 205' switches OFF.

Then, a control starts, in which, at a timing T9 where the predetermined engine automatic stop conditions are satisfied, the engine automatically stops, and at a timing T10 immediately after that, the operation of the electric pump 101 is started, and the operating pressure generated by the electric pump 101 is supplied as the first clutch pressure to the first clutch 10 through the shift valve 106, in which the spool is moved to the second position due to the stop of the mechanical pump 6, so as to re-couple the temporarily released first clutch 10.

Here, the electric pump 101 is operated at a first rotation speed that is a predetermined upper limit rotation speed, therefore, as indicated by the symbol C4, the discharged pressure of the electric pump 101 becomes the maximum pressure within a achievable range and the first clutch pressure rapidly raises, and, the first clutch 10 is swiftly coupled after the engine automatically stops.

Thereby, even in a case where the engine restarts after a comparatively short time since the engine automatically stops, the first clutch 10 is surely coupled. Therefore, a situation is avoided, in which the first clutch 10 slips when starting the vehicle due to the coupling of the first clutch 10 being delayed, and thereby, a desired response in starting the vehicle cannot be obtained.

When the first clutch pressure reaches the hydraulic pressure for switching ON by operating the electric pump 101 at the first rotation speed, that is at a timing T13, the rotation speed of the electric pump 101 is reduced to a second rotation speed that is lower than the first rotation speed, and, as indicated by the symbol C5, the first clutch pressure at this point is recognized as the hydraulic pressure, which is lower than the maximum pressure, required to maintain the coupled state of the first clutch 10. Thereby, an unnecessary energy usage caused by maintaining the state of the electric pump 101 operated at the high rotation speed more than required can be avoided.

Then, when the switching operation from the N-range to the D-range is performed, that is at the timing T11, the engine restarts and the mechanical pump 6 correspondingly starts the operation and the electric pump 101 stops, and thereby, the first clutch pressure generated by the mechanical pump 6 is supplied to the first clutch 10.

The operation of the third embodiment is achieved by a controlling operation of the control unit 200. Next, a controlling operation for achieving the operation is described in detail according to the flowchart in FIGS. 15A to 15C.

Figure 15A:
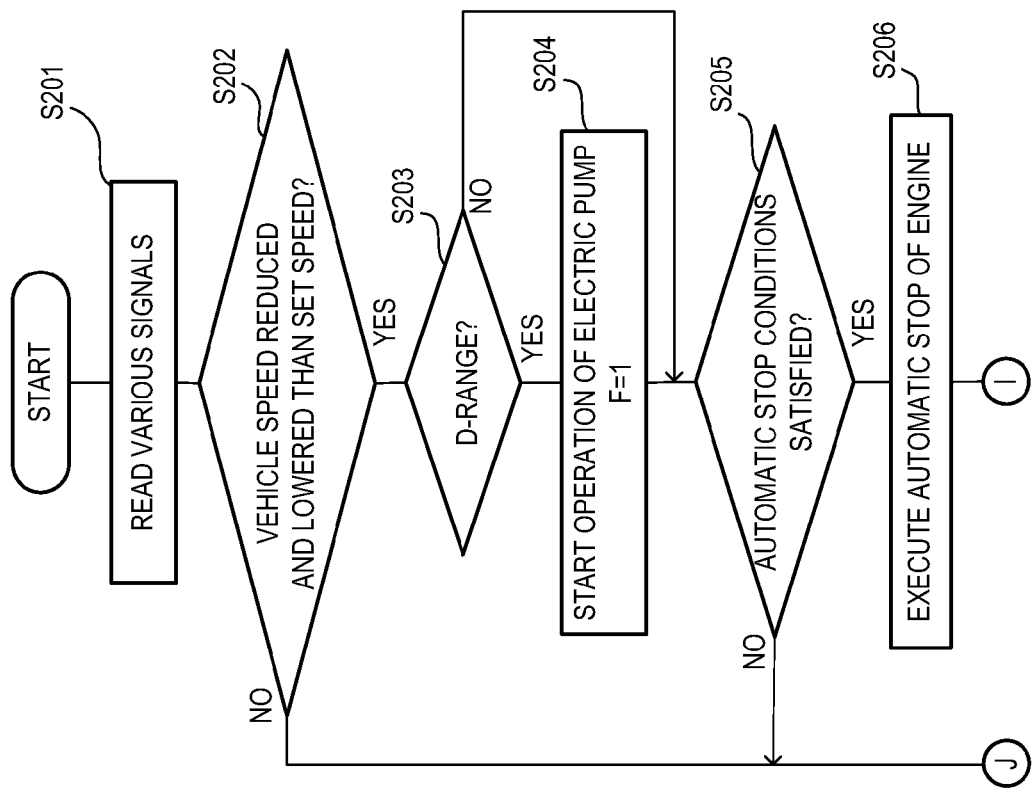
FIGS. 15A to 15C show a flowchart of an example control of the third embodiment.
Figure 15B:
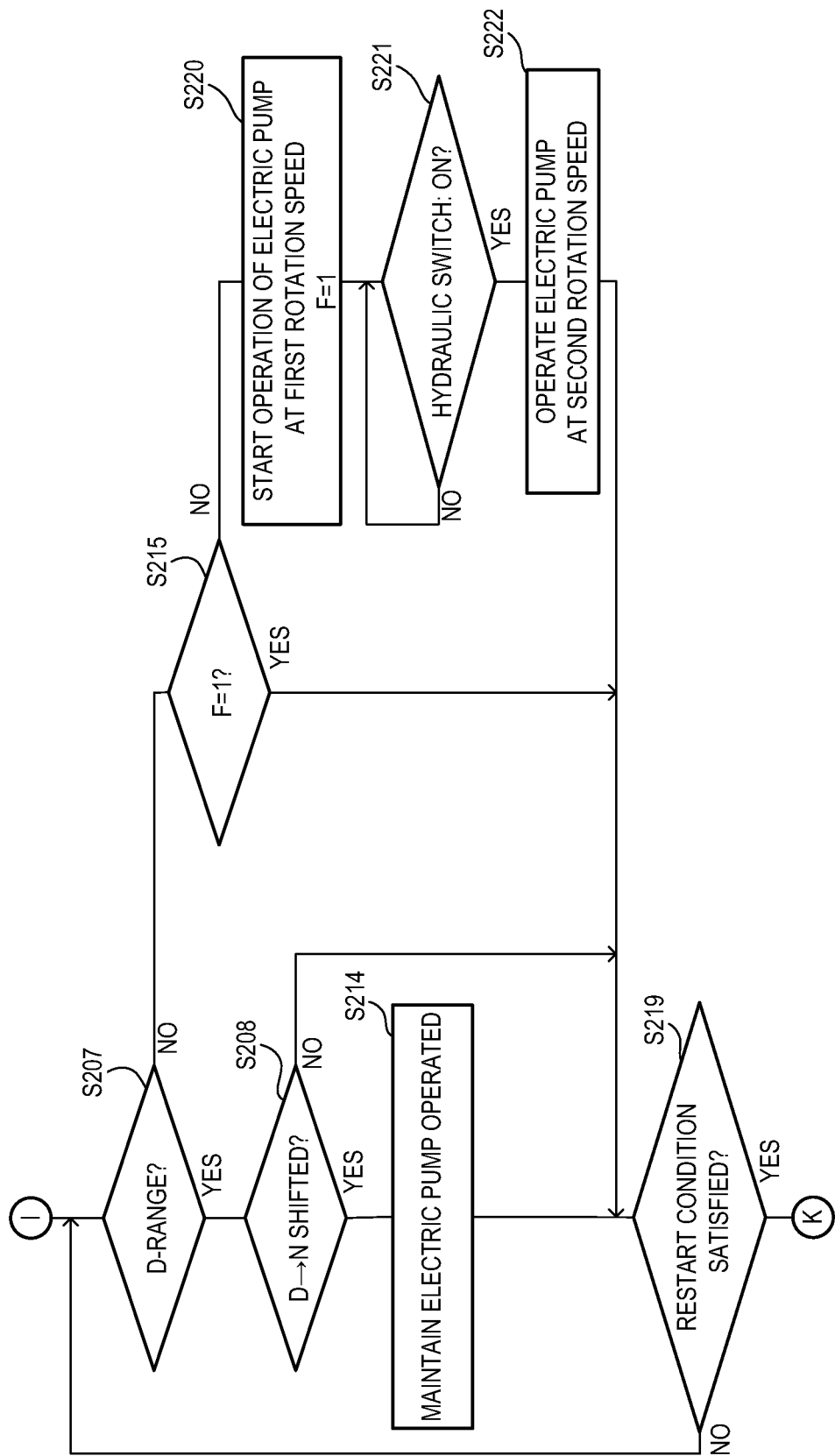
Figure 15C:
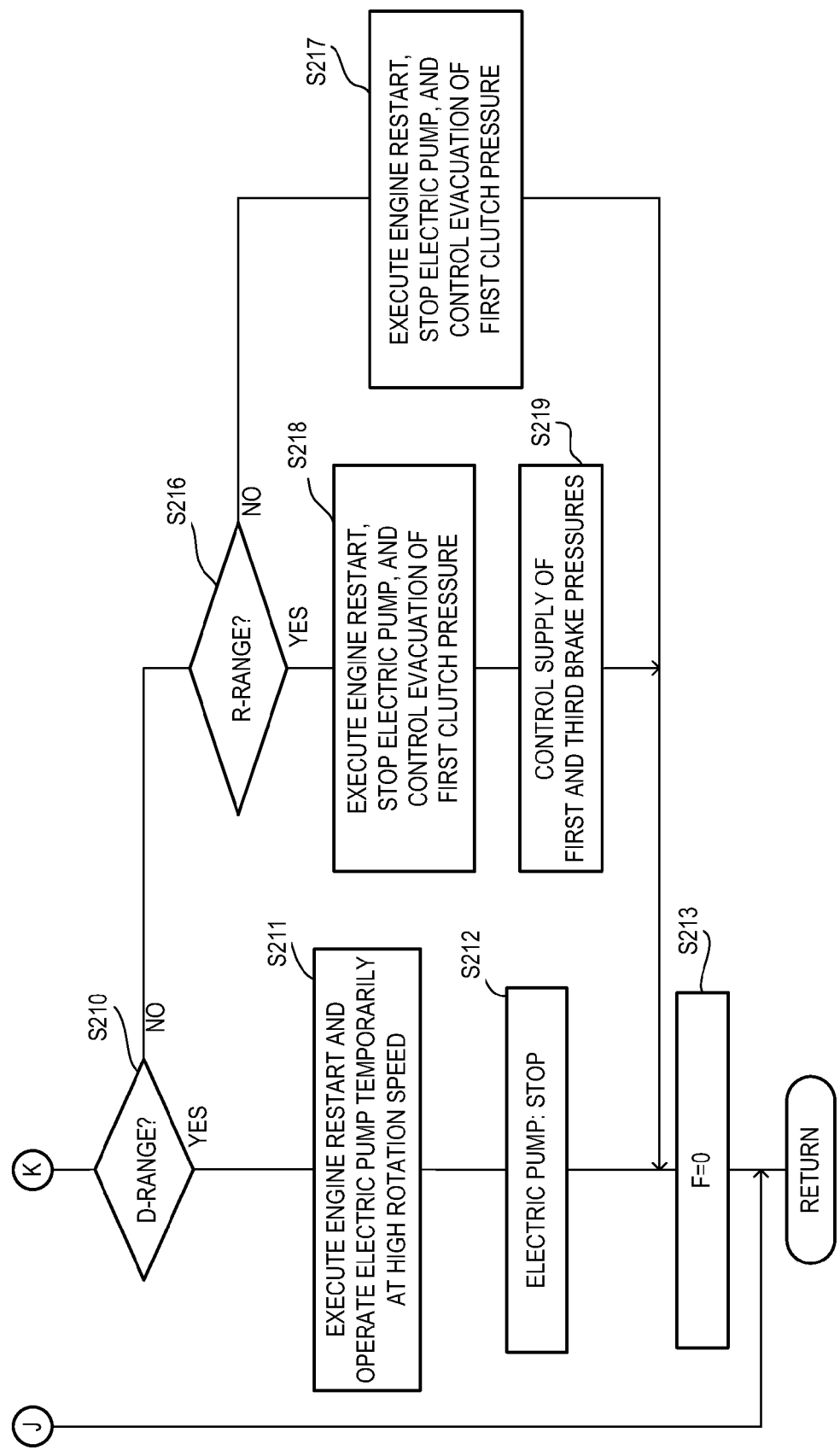

In this control, steps for executing the operation at the time of starting the operation of the electric pump 101 as indicated by the symbol C4 in FIG. 14 are added to the operations in the example of the basic control shown in FIGS. 11A to 11C. Steps S201 to S219 in FIGS. 15A to 15C are exactly the same as Steps S1 to S19 indicated by the flowchart in FIGS. 11A to 11C, and Step S20 in FIG. 11B is changed to Steps S220 to S222.

Steps S220 to S222 are performed when the range of the automatic transmission before the engine automatically stops while the vehicle is stopped is switched from the D-range to the N-range. In this case, the range of the automatic transmission is determined to be not the D-range (to be the N-range) at Step S203 while the vehicle is stopped, and next, without performing the operation starting control of the electric pump 101 at Step S204, the automatic stop conditions of the engine are determined to be satisfied and the engine automatically stops at Steps S205 and S206.

Further, because the range is the N-range, Steps S207 to S215 are performed, and then, because the flag F is not set to "1" at Step S204, Steps S220 to S222 are performed.

At Step S220, firstly, the electric pump is started to operate at the first rotation speed that is a predetermined upper limit rotation speed and the flag F is set to "1", and at a subsequent Step S221, a determination of whether the hydraulic switch 205' is ON is performed.

Further, when the hydraulic switch 205' is ON, that is when the first clutch pressure is rapidly increased by the electric pump 101 operating at the first rotation speed and reaches the predetermined hydraulic pressure for switching ON as shown in FIG. 14, at a subsequent Step S222, the rotation speed of the electric pump 101 is reduced to the second rotation speed.

Thereby, as described above, the first clutch 10 is swiftly coupled after the automatic stop of the engine, and even in the case where the engine restarts after a comparatively short time since the engine automatically stops, the good vehicle response in starting the vehicle can be obtained without causing the slipping of the first clutch 10. Further, after the first clutch 10 is coupled, the rotation speed of the electric pump 101 is reduced, and the unnecessary energy usage caused by maintaining the state of the electric pump 101 being operated at the high rotation speed more than required can be avoided. Next, similar to the example of the basic control, the restarting control of the engine is performed.

Figure 16:
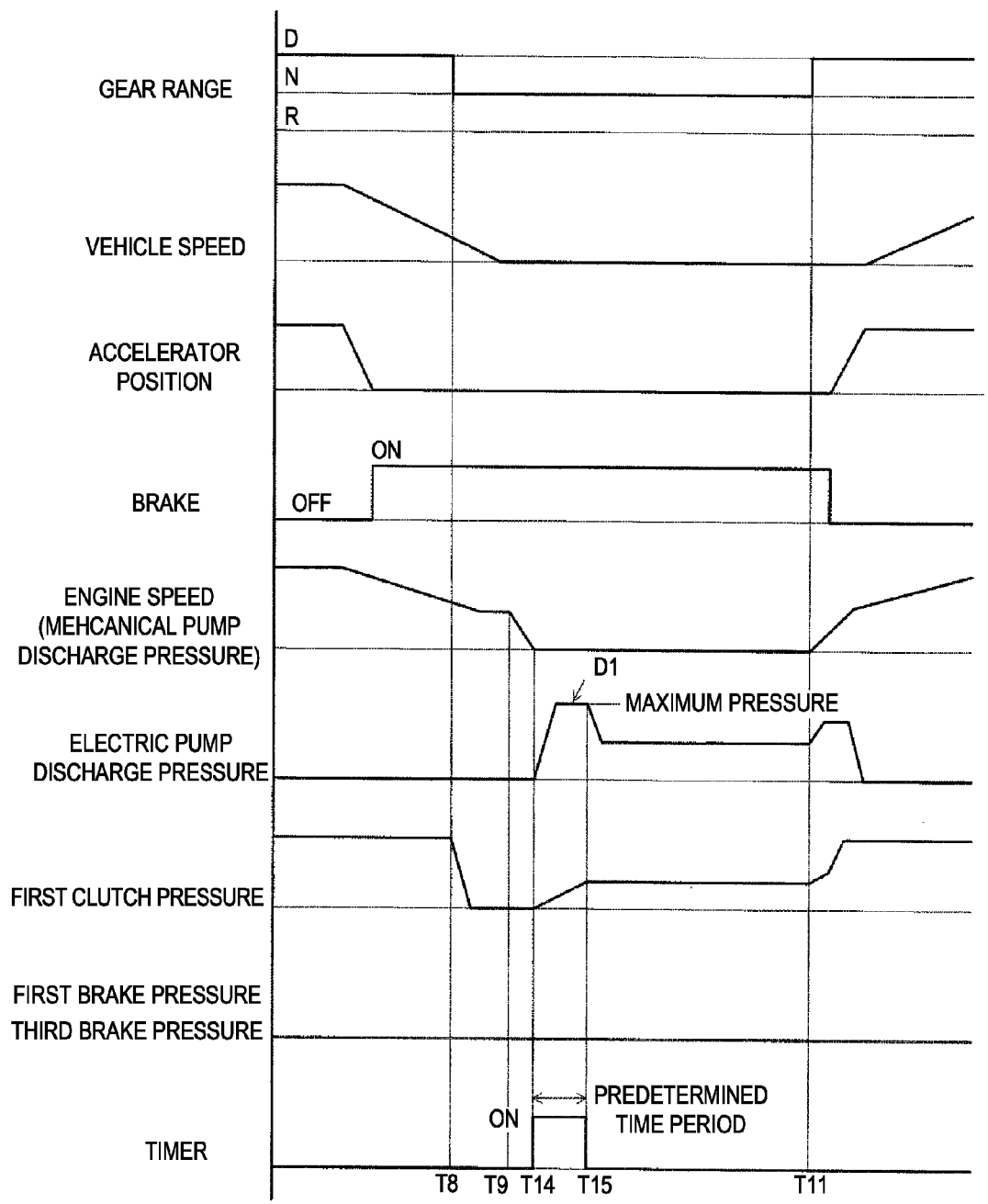
FIG. 16 is a timing chart showing an operation of a fourth embodiment of the present invention.

Next, the operations in the fourth embodiment as indicated by the timing chart in FIG. 16 are described.

Also these operations are for swiftly coupling the first clutch 10 when the switching operation from the D-range to the N-range is performed before the engine automatic stop while the vehicle is stopped. Moreover, similar to the operations in the third embodiment shown in FIG. 14, the switching operation from the D-range to the N-range is performed at the timing T8 that is before the engine automatic stop, and at this timing T8, the first clutch pressure supplied to the first clutch 10 is evacuated, and then the first clutch 10 is released.

Next, at the timing T9 where the predetermined engine automatic stop conditions are satisfied, the engine automatically stops, and at a timing T14 immediately after that, a control of starting the operation of the electric pump 101, supplying the operating pressure generated by the electric pump 101 to the first clutch 10 as the first clutch pressure, and re-coupling the temporarily released first clutch 10.

At this time, a timer installed within the control unit 200 starts timing, and at the same time, the electric pump 101 is operated at the first rotation speed similar to the third embodiment, which is the predetermined upper limit rotation speed, and the discharged pressure of the electric pump 101 is raised to the maximum pressure within the achievable range as indicated by the symbol D1.

Thereby, the first clutch pressure rapidly raises and, after the engine automatically stops, the first clutch 10 is swiftly coupled after the automatic stop of the engine, and even in the case where the engine restarts after a comparatively short time since the engine automatically stops, the good vehicle response in starting the vehicle can be obtained without causing the slipping of the first clutch 10.

Further, at a timing T15 where a predetermined time has elapsed since the timing T14 when the electric pump 101 is started operating at the first rotation speed, the rotation speed of the electric pump 101 is reduced to the second rotation speed that is lower than the first rotation speed, and, similar to the third embodiment, the unnecessary energy usage caused by maintaining the state of the electric pump 101 being operated at the high rotation speed more than required can be avoided.

Then, when the switching operation from the N-range to the D-range is performed, that is at the timing T11, the engine restarts and the mechanical pump 6 correspondingly starts the operation and the electric pump 101 stops, and thereby, the operating pressure generated by the mechanical pump 6 is supplied to the first clutch 10.

Figure 17A:
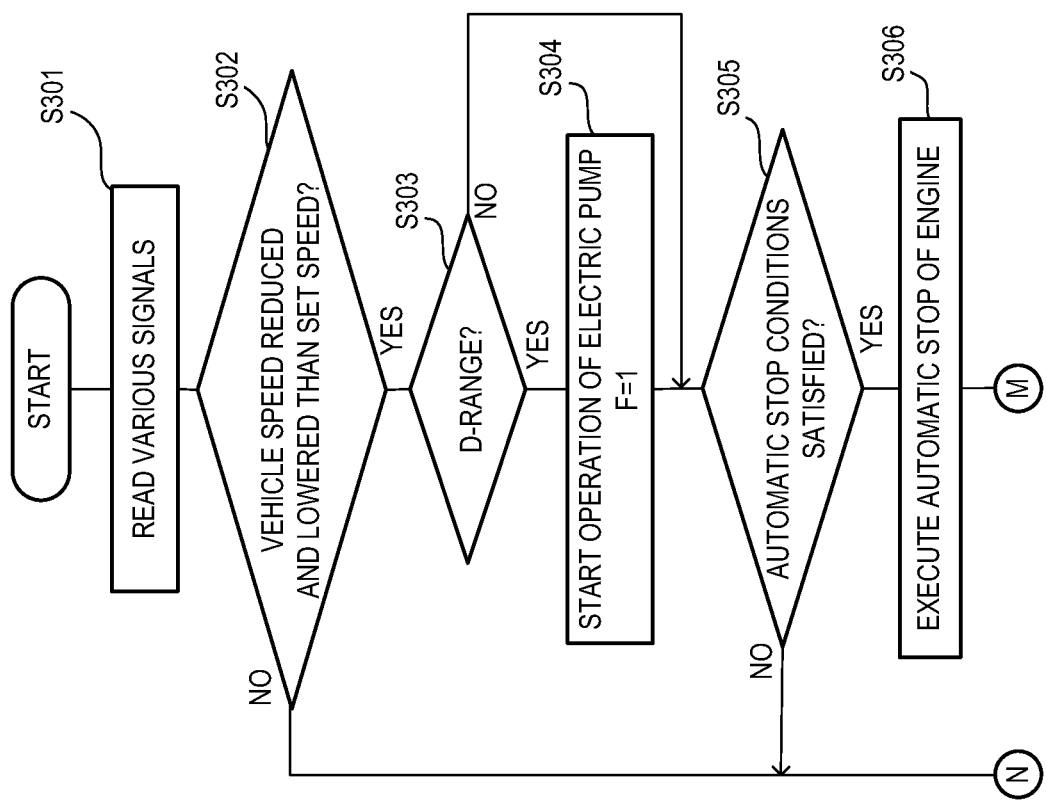
FIGS. 17A to 17C show a flowchart of an example control of the fourth embodiment.
Figure 17B:
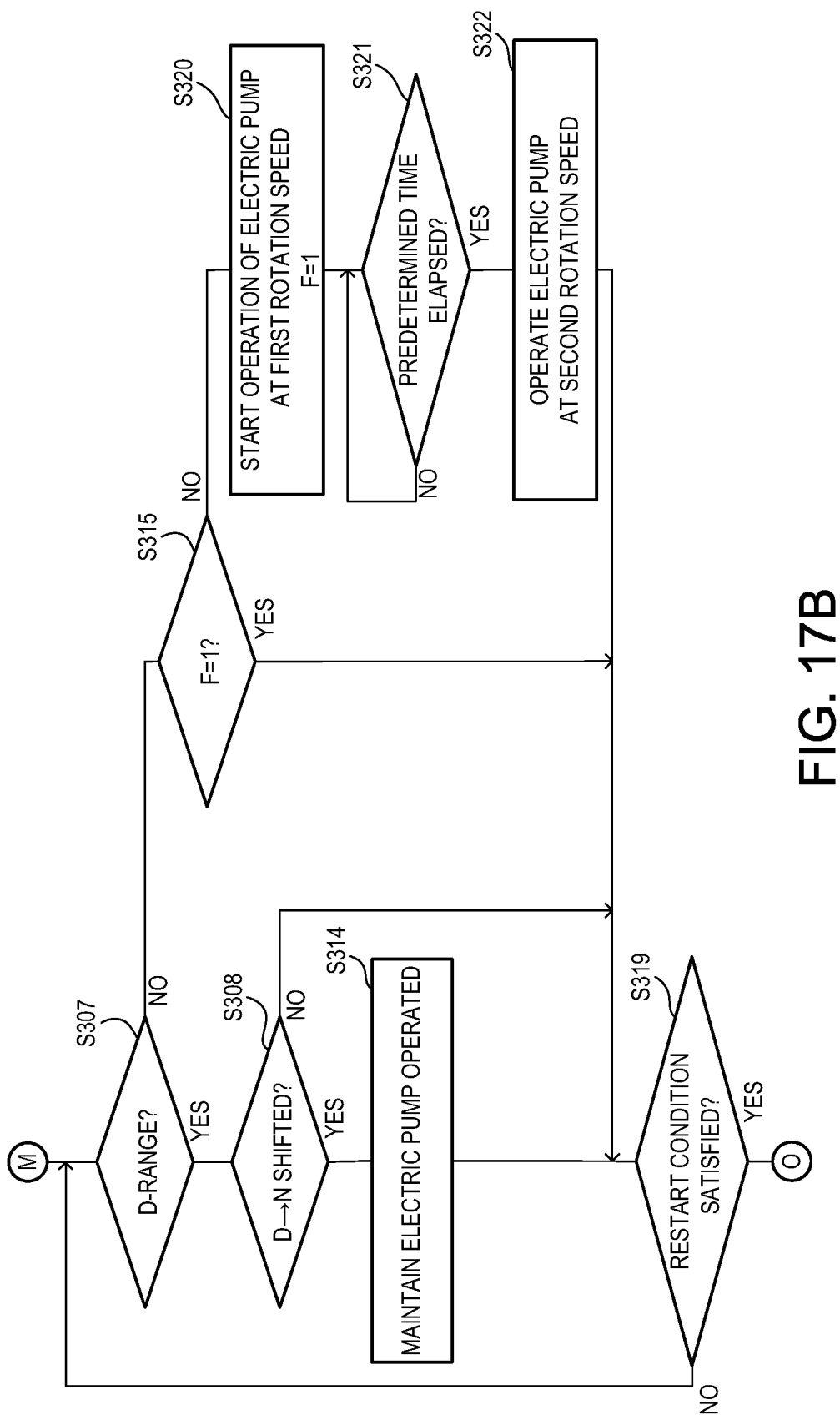
Figure 17C:
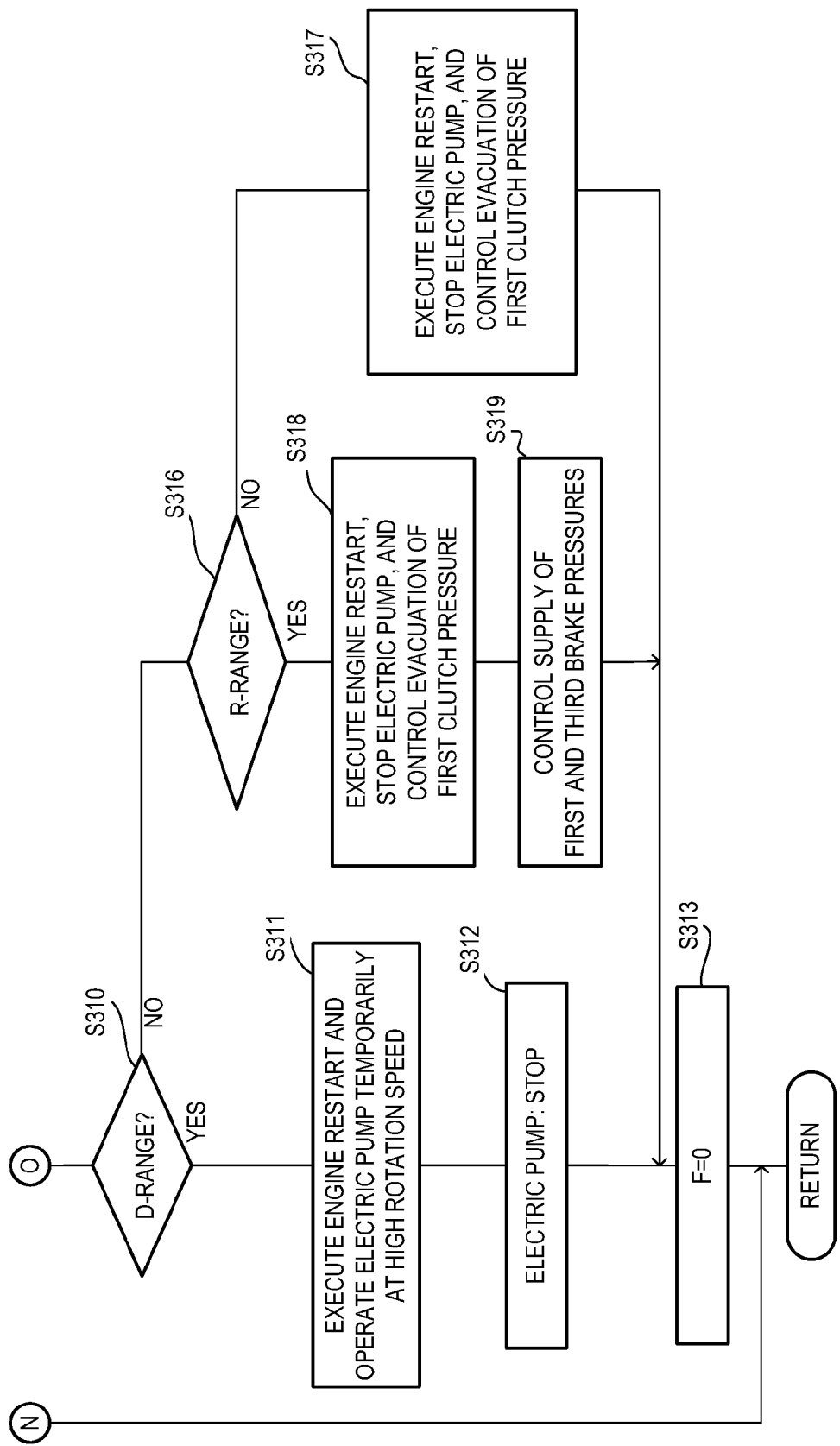

The operation of the fourth embodiment is achieved by a controlling operation of the control unit 200. The controlling operation is performed according to a flowchart in FIGS. 17A to 17C; however, the flowchart is mostly the same as the flowchart in the third embodiment as shown in FIGS. 15A to 15C. Steps S301 to S319 in FIGS. 17A to 17C are exactly the same as Steps S201 to S219 of the flowchart in FIGS. 15A to 15C, and Steps S320 to S322 in FIGS. 17A to 17C correspond to Steps S220 to S222 in FIGS. 15A to 15C.

That is, Steps S320 to S322 are also performed when the range of the automatic transmission before the engine automatically stops while the vehicle is stopped is switched from the D-range to the N-range. In this case, the range of the automatic transmission is determined to be not the D-range (to be the N-range) at Step S303 while the vehicle is stopped, and next, without performing the operation starting control of the electric pump 101 at Step S304, the automatic stop conditions of the engine are determined to be satisfied and the engine automatically stops at Steps S305 and S306.

Further, because the range is the N-range, Steps S307 to S315 are performed, and then, because the flag F is not set to "1" at Step S304, Steps S320 to S322 are performed. At Step S220, firstly, the electric pump is started to operate at the first rotation speed that is the predetermined upper limit rotation speed and the flag F is set to "1".

Next, at Step S321, is a determination of whether the predetermined time has elapsed after the electric pump 101 starts operating, and when the predetermined time has elapsed, the rotation speed of the electric pump 101 is reduced to the second rotation speed at a subsequent Step S322. Here, the predetermined time is set to the estimated time period that the first clutch 10 is coupled due to the first clutch pressure rapidly raising by the electric pump operating at the first rotation speed, which is the upper limit rotation speed.

Thereby, similar to the third embodiment, the first clutch 10 is swiftly coupled after the automatic stop of the engine, and even in the case where the engine restarts after a comparatively short time since the engine automatically stops, the good vehicle response in starting the vehicle can be obtained without causing the slipping of the first clutch 10. Further, after the first clutch 10 is coupled, the rotation speed of the electric pump 101 is reduced, and the unnecessary energy usage is suppressed. Then, the engine is restarted similar to the example of the basic control.

Figure 18:
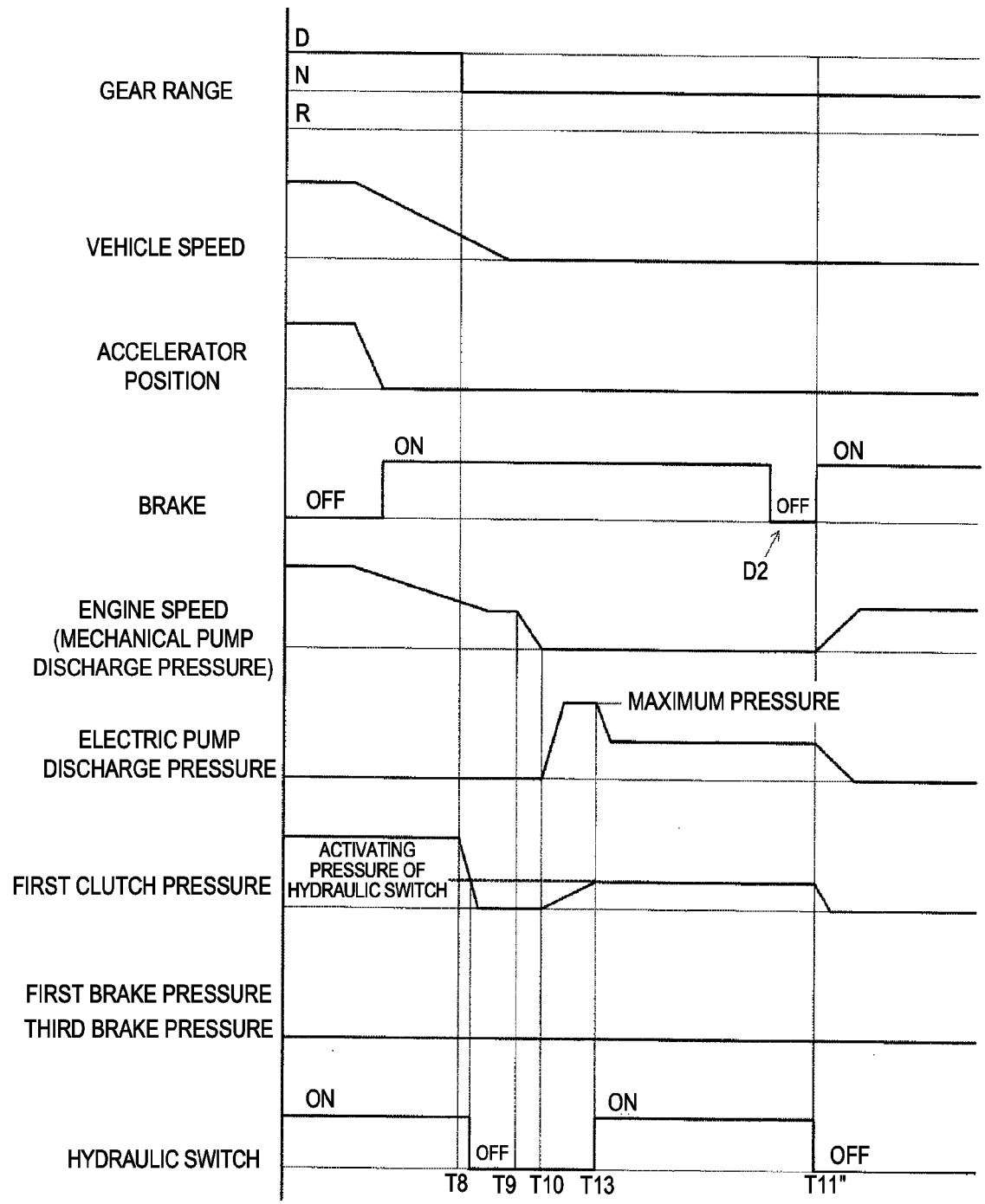
FIG. 18 is a timing chart showing an operation of a fifth embodiment of the present invention.

Next, the operations in the fifth embodiment as indicated by the timing chart in FIG. 18 are described.

These operations are for restarting the engine where the switching operation from the D-range to the N-range is performed before the engine automatic stop while the vehicle is stopped, and when the predetermined condition is satisfied after the engine automatic stop and before the switching operation to the D-range, the engine is restarted.

The operation under the engine automatic stop is similar to the operation in the third embodiment shown in FIG. 14, in which at the timing T8, which is before the engine automatic stop, the switching operation from the D-range to the N-range is performed and the first clutch pressure supplied to the first clutch 10 is evacuated and the first clutch 10 is released. Further, at the point where the first clutch pressure falls below the predetermined hydraulic pressure for switching ON, the hydraulic switch 205' is switched to OFF.

Then, the control starts, in which, at the timing T9 where the predetermined engine automatic stop conditions are satisfied, the engine automatically stops, and at the timing T10 immediately after that, the operation of the electric pump 101 is started, and the operating pressure is supplied to the first clutch 10 so as to re-couple the temporarily released first clutch 10.

Here, similar to in the third embodiment, the electric pump 101 is operated at the first rotation speed that is the upper limit rotation speed, therefore, the discharged pressure of the electric pump 101 becomes the maximum pressure within the achievable range, and the first clutch 10 is swiftly coupled after the engine automatically stops.

Further, when the first clutch pressure reaches the hydraulic pressure for switching ON due to the electric pump 101 operating at the first rotation speed, at the timing T13, the rotation speed of the electric pump 101 is reduced to the second rotation speed that is lower than the first rotation speed, and therefore, the unnecessary energy usage is suppressed.

Although, during the engine stop in the N-range, the coupled state of the brake coupled by the brake being depressed while the vehicle is stopped is maintained, prior to the switching operation to the D-range, when shifting of the brake from the coupled state, through the released state, and to the re-coupled state is detected by the brake switch 203, at a timing T11", the engine is restarted by recognizing the above shifting of the coupled state of the brake as a restart condition.

Therefore, in this embodiment, in the state where the range of the automatic transmission is the neutral range and the brake is coupled, and further while the engine being automatically stopped, when the brake is shifted from the coupled state, through the released state, and to the re-coupled state, in other words, when the vehicle is estimated to be started by the state of the automatic transmission being shifted to a traveling range immediately after the shifting of the brake to the re-coupled state, the engine automatically restarts at this point even without the switching operation from the N-range to the D-range by the vehicle's operator, and thereby, the engine starts without a delay according to the start request by the vehicle's operator.

As above, in the present invention, in the vehicle equipped with the automatic transmission for performing the idle stop control, even when the switching operation from the traveling range to the neutral range is performed while the engine is in automatic stop, a vehicle starting performance with a smooth and good response can be obtained in the next start of the vehicle, therefore, the present invention may appropriately be adopted in a field of manufacturing industry of such kind of vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

REFERENCE CHARACTER LIST

1 Automatic transmission
6 Mechanical pump
10 Predetermined friction element (first clutch)
101, 101' Hydraulic generation means (electric pump, accumulator)
100 Friction element control means (hydraulic control circuit)
121 Hydraulic control means (first linear solenoid valve)
200 Idling stop means (control unit)

The invention claimed is:

1. A vehicle idle stop system, comprising:
an internal combustion engine;
an automatic transmission;
a first oil pump driven by said engine and generating hydraulic pressure which is supplied to a friction element of said automatic transmission;
a second oil pump capable of operating and generating hydraulic pressure which is supplied to a friction element of said automatic transmission during an engine stop;
a controller configured to control:
said engine to stop when a predetermined engine stop condition is satisfied in a vehicle stop; and
said second oil pump to supply hydraulic pressure to a predetermined friction element coupled to a forward starting gear of the automatic transmission, the hydraulic pressure to couple the predetermined friction element when the engine is automatically stopped by the controller and when a gear range of the automatic transmission is in a neutral range; and
a first linear solenoid valve for controlling the hydraulic pressure supplied to the predetermined friction element;
wherein the first linear solenoid valve evacuates the hydraulic pressure supplied to the predetermined friction element when the engine is automatically stopped; and
wherein the engine is then automatically restarted in a state where the hydraulic pressure generated by the second oil pump is supplied to the predetermined friction element while the gear range of the automatic transmission is in the neutral range.

2. The idle stop system of claim 1, wherein, when the engine is automatically stopped after the gear range of the automatic transmission is switched to the neutral range from a forward traveling range and, when the engine is subsequently automatically restarted and the hydraulic pressure generated by the first oil pump instead of the second oil pump is supplied to the predetermined friction element,
the first linear solenoid valve suppresses an increase of the hydraulic pressure supplied to the predetermined friction element from the first oil pump when the hydraulic pressure supplied to the predetermined friction element by the second oil pump is lower than a predetermined value.

3. The idle stop system of claim 1, wherein a hydraulic control circuit is provided with a manual valve arranged between the first oil pump and the predetermined friction element, and for interlocking with a switching operation of a range to communicate the first oil pump with the predetermined friction element in a forward traveling range; and
wherein the second oil pump is connected with an oil passage communicating with the predetermined friction element from the manual valve, via a shift valve for selectively communicating one of an oil passage portion from a second oil pump side and an oil passage portion from a manual valve side with a predetermined friction element side.

4. The idle stop system of claim 1, wherein, when the gear range of the automatic transmission is switched to a reverse range from the neutral range during the engine automatic stop,
a hydraulic control circuit couples a friction element that is coupled at a reverse gear, and
the first linear solenoid valve evacuates the hydraulic pressure supplied to the predetermined friction element.

5. The idle stop system of claim 4, wherein, when the engine is automatically stopped after the gear range of the automatic transmission is switched to the neutral range from a forward traveling range and, when the engine is subsequently automatically restarted and the hydraulic pressure generated by the first oil pump instead of the second oil pump is supplied to the predetermined friction element,
the first linear solenoid valve suppresses an increase of the hydraulic pressure supplied to the predetermined friction element from the first oil pump when the hydraulic pressure supplied to the predetermined friction element by the second oil pump is lower than a predetermined value.

6. The idle stop system of claim 4, wherein the hydraulic control circuit is provided with a manual valve arranged between the first oil pump and the predetermined friction element and for interlocking with a switching operation of a range to communicate the first oil pump with the predetermined friction element in a forward traveling range; and
wherein the second oil pump is connected with an oil passage communicating with the predetermined friction element from the manual valve, via a shift valve for selectively communicating one of an oil passage portion from a second oil pump side and an oil passage portion from a manual valve side with a predetermined friction element side.

7. The idle stop system of claim 4, wherein the hydraulic control circuit couples the friction element that is coupled at a reverse gear after a coupling force of the predetermined friction element decreases below a predetermined value by evacuation of the hydraulic pressure.

8. The idle stop system of claim 7, wherein the hydraulic control circuit is provided with a manual valve arranged between the first oil pump and the predetermined friction element and for interlocking with a switching operation of a range to communicate the first oil pump with the predetermined friction element in a forward traveling range; and
wherein the second oil pump is connected with an oil passage communicating with the predetermined friction element from the manual valve, via a shift valve for selectively communicating one of an oil passage portion from a second oil pump side and an oil passage portion from a manual valve side with a predetermined friction element side.

9. The idle stop system of claim 7, wherein, when the engine is automatically stopped after the gear range of the automatic transmission is switched to the neutral range from a forward traveling range and, when the engine is subsequently automatically restarted and the hydraulic pressure generated by the first oil pump instead of the second oil pump is supplied to the predetermined friction element,
the first linear solenoid valve suppresses an increase of the hydraulic pressure supplied to the predetermined friction element from the first oil pump when the hydraulic pressure supplied to the predetermined friction element by the second oil pump is lower than a predetermined value.

10. The idle stop system of claim 9, wherein the hydraulic control circuit is provided with a manual valve arranged between the first oil pump and the predetermined friction element and for interlocking with a switching operation of a range to communicate the first oil pump with the predetermined friction element in a forward traveling range; and
wherein the second oil pump is connected with an oil passage communicating with the predetermined friction element from the manual valve, via a shift valve for selectively communicating one of an oil passage portion from a second pump side and an oil passage portion from a manual valve side with a predetermined friction element side.

11. A vehicle idle stop system, comprising:
an internal combustion engine;
an automatic transmission;
a first oil pump driven by said engine and generating hydraulic pressure which is supplied to a friction element of said automatic transmission;
a second oil pump capable of operating and generating hydraulic pressure which is supplied to a friction element of said automatic transmission during an engine stop;
a controller configured to control:
said engine to stop when a predetermined engine stop condition is satisfied in a vehicle stop; and
said second oil pump to supply hydraulic pressure to a predetermined friction element coupled to a forward starting gear of the automatic transmission, the hydraulic pressure to couple the predetermined friction element when the engine is automatically stopped by the controller and when a gear range of the automatic transmission is in a neutral range; and
a first linear solenoid valve for controlling the hydraulic pressure supplied to the predetermined friction element;
wherein, when the gear range of the automatic transmission is switched to a reverse range from the neutral range during the engine automatic stop,
a hydraulic control circuit couples a friction element that is coupled at a reverse gear, and
the first linear solenoid valve evacuates the hydraulic pressure supplied to the predetermined friction element.

12. A vehicle idle stop system, comprising:
an internal combustion engine;
an automatic transmission;
a first oil pump driven by said engine and generating hydraulic pressure which is supplied to a friction element of said automatic transmission;
a second oil pump capable of operating and generating hydraulic pressure which is supplied to a friction element of said automatic transmission during an engine stop;
a controller configured to control:
said engine to stop when a predetermined engine stop condition is satisfied in a vehicle stop; and
said second oil pump to supply hydraulic pressure to a predetermined friction element coupled to a forward starting gear of the automatic transmission, the hydraulic pressure to couple the predetermined friction element when the engine is automatically stopped by the controller and when a gear range of the automatic transmission is in a neutral range; and
a first linear solenoid valve for controlling the hydraulic pressure supplied to the predetermined friction element;
wherein, when the engine is automatically stopped after the gear range of the automatic transmission is switched to the neutral range from a forward traveling range and, when the engine is subsequently automatically restarted and the hydraulic pressure generated by the first oil pump instead of the second oil pump is supplied to the predetermined friction element,
the first linear solenoid valve suppresses an increase of the hydraulic pressure supplied to the predetermined friction element from the first oil pump when the hydraulic pressure supplied to the predetermined friction element by the second oil pump is lower than a predetermined value.

13. A vehicle idle stop system, comprising:
an internal combustion engine;
an automatic transmission;
a first oil pump driven by said engine and generating hydraulic pressure which is supplied to a friction element of said automatic transmission;
a second oil pump capable of operating and generating hydraulic pressure which is supplied to a friction element of said automatic transmission during an engine stop;
a controller configured to control:
said engine to stop when a predetermined engine stop condition is satisfied in a vehicle stop; and
said second oil pump to supply hydraulic pressure to a predetermined friction element coupled to a forward starting gear of the automatic transmission, the hydraulic pressure to couple the predetermined friction element when the engine is automatically stopped by the controller and when a gear range of the automatic transmission is in a neutral range;
wherein a hydraulic control circuit is provided with a manual valve arranged between the first oil pump and the predetermined friction element and for interlocking with a switching operation of a range to communicate the first oil pump with the predetermined friction element in a forward traveling range; and
wherein the second oil pump is connected with an oil passage communicating with the predetermined friction element from the manual valve, via a shift valve for selectively communicating one of an oil passage portion from a second oil pump side and an oil passage portion from a manual valve side with a predetermined friction element side.

14. A vehicle idle stop system, comprising:
an internal combustion engine;
an automatic transmission;
a first oil pump driven by said engine and generating hydraulic pressure which is supplied to a friction element of said automatic transmission;
a second oil pump capable of operating and generating hydraulic pressure which is supplied to a friction element of said automatic transmission during an engine stop;
a controller configured to control:
said engine to stop when a predetermined engine stop condition is satisfied in a vehicle stop; and
said second oil pump to supply hydraulic pressure to a predetermined friction element coupled to a forward starting gear of the automatic transmission, the hydraulic pressure to couple the predetermined friction element when the engine is automatically stopped by the controller and when a gear range of the automatic transmission is in a neutral range;
wherein the second oil pump is an electric oil pump and includes a pump motor for controlling a rotation speed of the electric oil pump, and wherein the controller is further configured to receive input from a range sensor for detecting a coupling state of the predetermined friction element; and
wherein the pump motor controls the rotation speed of the electric oil pump to a first predetermined rotation speed when the engine is automatically stopped in a state where the automatic transmission is in a neutral range, and the pump motor subsequently controls the rotation speed to a second rotation speed that is lower than the first rotation speed when the controller detects that the predetermined friction element is coupled.

15. The idle stop system of claim 14, wherein the controller is further configured to receive input from a brake sensor for detecting an operating state of a brake;
  wherein, in a state where the gear range of the automatic transmission is in the neutral range and the controller detects coupling of the brake, when the engine is automatically stopped by the controller,
  the controller restarts the engine when the controller detects that the brake is shifted from the coupling state to a re-coupling state via a released state.

16. The idle stop control device of claim 14, wherein the first rotation speed is a maximum rotation speed that is set to the electric oil pump in advance.

17. The idle stop system of claim 16, wherein the controller is further configured to receive input from a brake sensor for detecting an operating state of a brake;
  wherein, in a state where the gear range of the automatic transmission is in the neutral range and the controller detects coupling of the brake, when the engine is automatically stopped by the controller,
  the controller restarts the engine when the controller detects that the brake is shifted from the coupling state to a re-coupling state via a released state.

18. A vehicle idle stop system, comprising:
  an internal combustion engine;
  an automatic transmission;
  a first oil pump driven by said engine and generating hydraulic pressure which is supplied to a friction element of said automatic transmission;
  a second oil pump capable of operating and generating hydraulic pressure which is supplied to a friction element of said automatic transmission during an engine stop;
  a controller configured to control:
    said engine to stop when a predetermined engine stop condition is satisfied in a vehicle stop; and
    said second oil pump to supply hydraulic pressure to a predetermined friction element coupled to a forward starting gear of the automatic transmission, the hydraulic pressure to couple the predetermined friction element when the engine is automatically stopped by the controller and when a gear range of the automatic transmission is in a neutral range;
  wherein the second oil pump is an electric oil pump and includes a pump motor for controlling a rotation speed of the electric oil pump; and
  wherein the pump motor controls the rotation speed of the electric oil pump to a first predetermined rotation speed for a predetermined time period when the engine is automatically stopped in a state where the automatic transmission is in a neutral range, and the pump control module subsequently controls the rotation speed to a second rotation speed that is lower than the first rotation speed.

19. The idle stop system of claim 18, wherein the controller is further configured to receive input from a brake sensor for detecting an operating state of a brake;
  wherein, in a state where the gear range of the automatic transmission is in the neutral range and the controller detects coupling of the brake, when the engine is automatically stopped by the controller,
  the controller restarts the engine when the controller detects that the brake is shifted from the coupling state to a re-coupling state via a released state.

20. The idle stop system of claim 18, wherein the first rotation speed is a maximum rotation speed that is set to the electric oil pump in advance.

21. The idle stop system of claim 20, wherein the controller is further configured to receive input from a brake sensor for detecting an operating state of a brake;
  wherein, in a state where the gear range of the automatic transmission is in the neutral range and the controller detects coupling of the brake, when the engine is automatically stopped by the controller,
  the controller restarts the engine when the controller detects that the brake is shifted from the coupling state to a re-coupling state via a released state.

22. A vehicle idle stop system, comprising:
  an internal combustion engine;
  an automatic transmission;
  a first oil pump driven by said engine and generating hydraulic pressure which is supplied to a friction element of said automatic transmission;
  a second oil pump capable of operating and generating hydraulic pressure which is supplied to a friction element of said automatic transmission during an engine stop;
  a controller configured to control:
    said engine to stop when a predetermined engine stop condition is satisfied in a vehicle stop; and
    said second oil pump to supply hydraulic pressure to a predetermined friction element coupled to a forward starting gear of the automatic transmission, the hydraulic pressure to couple the predetermined friction element when the engine is automatically stopped by the controller and when a gear range of the automatic transmission is in a neutral range;
  wherein the controller is further configured to receive input from a brake sensor for detecting an operating state of a brake;
  wherein, in a state where the gear range of the automatic transmission is in the neutral range and an operating state detection module detects coupling of the brake, when the engine is automatically stopped by the controller,
  the controller restarts the engine when the controller detects that the brake is shifted from the coupling state to a re-coupling state via a released state.

* * * * *